United States Patent
Xu et al.

(10) Patent No.: US 11,876,178 B2
(45) Date of Patent: Jan. 16, 2024

(54) HIGH VOLTAGE AQUEOUS ELECTROLYTE SYSTEM FOR LITHIUM METAL OR GRAPHITE ANODE

(71) Applicants: University of Maryland, College Park, College Park, MD (US); The United States of America as Represented by the Secretary of the Army, Washington, DC (US)

(72) Inventors: Kang Xu, Potomac, MD (US); Chunsheng Wang, Silver Spring, MD (US); Chongyin Yang, College Park, MD (US)

(73) Assignees: University of Maryland, College Park, College Park, MD (US); The United States of America as Represented by the Secretary of the Army, Washington, DC (US)

( * ) Notice: Subject to any disclaimer, the term of this patent is extended or adjusted under 35 U.S.C. 154(b) by 229 days.

(21) Appl. No.: 16/641,895

(22) PCT Filed: Aug. 24, 2018

(86) PCT No.: PCT/US2018/048006
§ 371 (c)(1),
(2) Date: Feb. 25, 2020

(87) PCT Pub. No.: WO2019/040906
PCT Pub. Date: Feb. 28, 2019

(65) Prior Publication Data
US 2020/0251779 A1    Aug. 6, 2020

Related U.S. Application Data

(60) Provisional application No. 62/550,456, filed on Aug. 25, 2017.

(51) Int. Cl.
    *H01M 10/0567*    (2010.01)
    *H01M 4/131*    (2010.01)
    (Continued)

(52) U.S. Cl.
    CPC ....... *H01M 10/0567* (2013.01); *H01M 4/131* (2013.01); *H01M 4/134* (2013.01);
    (Continued)

(58) Field of Classification Search
    CPC .................. H01M 2300/0002; H01M 10/36
    See application file for complete search history.

(56) References Cited

U.S. PATENT DOCUMENTS

2013/0337338 A1    12/2013    Tikhonov et al.
2015/0318530 A1*   11/2015    Yushin ................. H01M 4/628
                                                                                  429/131
(Continued)

FOREIGN PATENT DOCUMENTS

WO    WO-2017105578 A2    6/2017

OTHER PUBLICATIONS

Suo, Liumin, et al. ""Water-in-salt" electrolyte enables high-voltage aqueous lithium-ion chemistries." Science 350.6263 (2015): 938-943. (Year: 2015).*

(Continued)

*Primary Examiner* — Allison Bourke
*Assistant Examiner* — Bethany C Bouchard
(74) *Attorney, Agent, or Firm* — Sterne, Kessler, Goldstein & Fox P.L.L.C.

(57) ABSTRACT

The present invention is directed to aqueous solid state electrolytes that comprise a fluoride additive to stabilize the interface between the anode and aqueous electrolyte. The present invention is also directed to methods of making the solid state electrolyte materials and methods of using the (Continued)

solid state electrolyte materials in batteries and other electrochemical technologies.

16 Claims, 13 Drawing Sheets

(51) Int. Cl.
- *H01M 4/134* (2010.01)
- *H01M 4/38* (2006.01)
- *H01M 4/505* (2010.01)
- *H01M 4/583* (2010.01)
- *H01M 4/66* (2006.01)
- *H01M 10/0525* (2010.01)
- *H01M 4/02* (2006.01)

(52) U.S. Cl.
CPC .......... *H01M 4/386* (2013.01); *H01M 4/505* (2013.01); *H01M 4/5835* (2013.01); *H01M 4/667* (2013.01); *H01M 10/0525* (2013.01); *H01M 2004/021* (2013.01)

(56) References Cited

U.S. PATENT DOCUMENTS

| | | | |
|---|---|---|---|
| 2018/0254524 A1* | 9/2018 | Zhang | H01M 10/0568 |
| 2018/0277885 A1* | 9/2018 | Takami | H01M 6/045 |

OTHER PUBLICATIONS

Wang, Xujiong, et al. "An aqueous rechargeable lithium battery using coated Li metal as anode." Scientific reports 3.1 (2013): 1-5. (Year: 2013).*

Fan, X., et al., "Highly Fluorinated Interphases Enable High-Voltage Li-Metal Batteries," Chem 4(1):174-185, Cell Press, United States (Jan. 2018).

International Search Report and Written Opinion for International Application No. PCT/US2018/048006, ISA/US, Commissioner for Patents, Alexandria, Virginia, dated Oct. 16, 2018, 14 pages.

Suo, L., et al., "Water-in-salt electrolyte enables high-voltage aqueous lithium-ion chemistries," Science 350(6263):938-943, American Association for the Advancement of Science, United States (Nov. 2015).

Yang, C., et al., "4.0 V Aqueous Li-Ion Batteries," Joule 1(1): 122-132, Cell Press, United States (Sep. 2017).

\* cited by examiner

HIGH VOLTAGE AQUEOUS ELECTROLYTE SYSTEM FOR LITHIUM METAL OR GRAPHITE ANODE

STATEMENT REGARDING FEDERALLY SPONSORED RESEARCH OR DEVELOPMENT

This invention was made with government support under DEAR0000389 awarded by the Department of Energy. The government has certain rights in the invention.

BACKGROUND OF THE INVENTION

Field of the Invention

The present invention is directed to aqueous solid state electrolytes that comprise a fluoride additive to stabilize the interface between the anode and the aqueous electrolyte. The present invention is also directed to methods of making the solid state electrolyte materials and methods of using the solid state electrolyte materials in batteries and other electrochemical technologies.

Background

Since its birth almost three decades ago, lithium-ion batteries (LIBs) have reshaped our lives with their omnipresence in our portable electronics. With gradual adoption into power trains of electric vehicles and grid storage, large format LIBs (>30 Ah) are more and more rigorously scrutinized for their safety, as their rare but high-profile fire/explosion accidents and subsequent recalls cast increasing doubts over their large-scale applications. Upon closer examination, the fundamental cause of those safety hazards can be identified as the undesired combination of high energy electrodes and flammable non-aqueous electrolytes in LIB. Clearly, resolution of LIB safety concerns on a materials level requires the removal of at least one factor from the equation: the high energy electrode as the main energy source, or the non-aqueous electrolyte solvents (carbonate esters) as fuel in the chemical combustion following accidental thermal runaway.

Water emerges as a natural replacement for the flammable non-aqueous solvents, because it is not only non-flammable, but also an excellent solvent as characterized by both high dipole moment (1.8546 debye), high acceptor and donor numbers (AN=54.8, DN=18) as well as high dielectric constant (E=78 at 25° C.).

However, water offers a rather narrow electrochemical stability window which is 1.23 V under thermodynamic equilibria. At pH=7.0, its cathodic and anodic limits are located at 2.62 V and 3.85 V vs. Li, respectively, while most LIB chemistries situate far beyond these limits (e.g., Li metal: 0.0 V; graphite: 0.10 V; silicon: 0.30 V; $LiMnO_2$: 4.10 V; $LiNi_{1/3}Mn_3Co_{1/3}O_2$: 4.20 V; and $LiNi_{0.5}Mn_{0.5}O_4$: 4.60 V). Those few that do fit in this narrow electrochemical stability window, such as $LiTi_2(PO_4)$: 2.70 V; $TiP_2O_7$: 2.90 V; $VO_2$: 2.70 V; and $LiFePO_4$: 3.50 V, can only assemble an aqueous battery with cell voltages below 1.50 V and energy density below 70 Wh/kg, along with significantly compromised cycling stabilities.

Aqueous lithium ion batteries (ALIBs) attract attention due to the intrinsic non-flammable nature introduced by the aqueous electrolytes therein. See Li, W., et al., Science 264:1115-1118 (1994). Due to their aqueous content, it is possible to avoid the rigorous moisture-free manufacturing environment and heavy reliance on the battery management systems necessary at the module or pack levels. See Dunn, B., et al., Science 334:928-935 (2011). Despite these advantages, the practical application of ALIBs remains remote, primarily limited by the inferior energy densities that are imposed by the narrow electrochemical stability window of water (1.23 V). See Lux, S. F., et al., *J. Electrochem. Soc.* 160: A1694-A1700 (2013). The stability window of 3.0 V (1.9-4.9 V vs. Li) provides unprecedented flexibility in selecting electrochemical couples, allowing the use of many electrode materials that were otherwise forbidden in conventional aqueous electrolytes. Hence, identifying electrodes with suitable lithiation/delithiation potentials, as well as stability for this new class of aqueous electrolytes becomes a new challenge in maximizing the deliverable energy density of a full aqueous Li-ion battery.

Constrained by the narrow electrochemical stability window of water (1.23 V under thermodynamic equilibria), aqueous batteries have always been considered subpar to their non-aqueous counterparts in terms of energy density; although the latter bear the intrinsic disadvantages of being flammable, toxic, vulnerable against mechanical abuses and unable to operate in the open atmosphere. Recent efforts in expanding the stability window of water have led to a new class of 3.0 V aqueous electrolytes, which enabled a series of "high voltage" aqueous battery chemistries. However, their energy densities (100-200 Wh/kg based on total electrode mass) still falls short when compared with state-of-the-art Li-ion batteries (LIBs, 400 Wh/Kg). The essential origin of this energy density gap comes from the cathodic stability limit of these new aqueous electrolytes, which is situated at an awkward location (1.7-1.9 V vs. Li) excluding the use of the most ideal anode materials, such as graphite (0.1 V vs Li), Si (0.3 V), and Li metal (0.0 V).

In contrast to non-aqueous electrolyte systems where cathode and anode materials often operate far beyond thermodynamic stability limits of electrolyte components (K. Xu, *Chem. Rev.* 104, 4303-4417 (2004); and K. Xu, *Chem. Rev.* 114, 11503-11618 (2014)), kinetic protection from a SEI in aqueous media is more difficult to achieve. Such interphases, occurring between electrode surfaces and electrolyte, are formed by sacrificial electrolyte decomposition during the initial charging, and constitute a barrier allowing ionic conduction but forbidding electronic conduction. Their presence significantly expands the usable electrochemical stability window of electrolytes. The absence of a protective interphase in conventional aqueous electrolytes is because none of the decomposition products from water ($H_2$, $O_2$, or OH) can deposit in dense solid state. In the absence of interphases, aqueous Li-ion batteries are typically limited to low voltage (<1.5 V) and low energy density (<70 Wh/Kg), often with rapid capacity fading and low Coulombic efficiency. The latter became especially pronounced at low C rates.

There is a need to increase the interfacial contact between the aqueous electrolyte and anode materials. Thus, there is a need to stabilize the interface between the anode and aqueous electrolyte and increase the materials available for use in lithium ion batteries.

BRIEF SUMMARY OF THE INVENTION

The present disclosure provides a composition comprising:
(a) an anode;
(b) an aqueous electrolyte; and
(c) an electrolyte interphase layer;

wherein the electrolyte interphase layer covers the anode and separates it from the aqueous electrolyte.

In some embodiments, the anode in the composition comprises lithium metal, graphite, silicon, or combinations thereof.

In some embodiments, the anode in the composition comprises lithium metal. In some embodiments, the anode in the composition comprises graphite. In some embodiments, the anode in the composition comprises silicon.

In some embodiments, the electrolyte interphase layer in the composition comprises a decomposition product of at least one fluoride additive.

In some embodiments, the at least one fluoride additive in the composition comprises an organic fluorinated hydrocarbon or an inorganic fluoride.

In some embodiments, the at least one fluoride additive in the composition comprises a fluorinated ether.

In some embodiments, the at least one fluoride additive in the composition comprises 1,1,2,2,-tetrafluoroethyl-2',2',2'-trifluoroethyl ether.

In some embodiments, the electrolyte interphase layer in the composition covers between about 40% and about 100% of the surface area of the anode.

In some embodiments, the electrolyte interphase layer in the composition further comprises polyethylene oxide.

In some embodiments, the electrolyte interphase layer in the composition further comprises a lithium salt. In some embodiments, the lithium salt in the electrolyte interphase layer comprises $LiN(SO_2CF_3)_2$.

In some embodiments, the present disclosure provides an electrochemical cell comprising:
(a) an anode;
(b) a cathode;
(c) an electrolyte interphase layer; and
(d) an aqueous electrolyte;
wherein the electrolyte interphase layer covers the anode and separates it from the aqueous electrolyte.

In some embodiments, the anode in the electrochemical cell comprises lithium metal, graphite, silicon, or a combination thereof. In some embodiments, the anode in the electrochemical cell comprises lithium metal. In some embodiments, the anode in the electrochemical cell comprises graphite. In some embodiments, the anode in the electrochemical cell comprises silicon.

In some embodiments, the electrolyte interphase layer in the electrochemical cell comprises a decomposition product of at least one fluoride additive.

In some embodiments, the at least one fluoride additive in the electrochemical cell comprises an organic fluorinated hydrocarbon or an inorganic fluoride.

In some embodiments, the at least one fluoride additive in the electrochemical cell comprises a fluorinated ether.

In some embodiments, the at least one fluoride additive in the electrochemical cell comprises 1,1,2,2,-tetrafluoroethyl-2',2',2'-trifluoroethyl ether.

In some embodiments, the electrolyte interphase layer comprises between about 0.05% and about 20% mass percentage of the at least one fluoride additive, wherein the mass percentage is measured by total mass of the fluoride additive and the aqueous electrolyte.

In some embodiments, the electrolyte interphase layer in the electrochemical cell covers between about 40% and about 100% of the surface area of the anode.

In some embodiments, the aqueous electrolyte in the electrochemical cell comprises at least one lithium salt.

In some embodiments, the aqueous electrolyte in the electrochemical cell comprises at least one lithium salt selected from the group consisting of $LiN(SO_2CF_3)_2$, $LiN(SO_2CH_3)_2$, $LiN(SO_2C_4H_9)_2$, $LiN(SO_2C_2F_5)_2$, $LiN(SO_2C_4F_9)_2$, $LiN(SO_2F_3)(SO_2C_4F_9)$, $LiN(SO_2C_2F_5)(SO_2C_4F_9)$, $LiN(SO_2C_2F_4SO_2)$, $LiN(SO_2F)_2$, $LiN(SO_2F)(SO_2CF_3)$, and $LiOSO_2CF_3$.

In some embodiments, the aqueous electrolyte in the electrochemical cell comprises $LiN(SO_2CF_3)_2$ and $LiOSO_2CF_3$.

In some embodiments, the electrolyte interphase layer in the electrochemical cell further comprises polyethylene.

In some embodiments, the cathode in the electrochemical cell comprises a cathode active material selected from the group consisting of lithium, magnesium, aluminum, molybdenum, zinc, chromium, iron, nickel, tin, lead, copper, silver, palladium, mercury, platinum, gold, combinations thereof, metal alloys thereof, metal oxides thereof, metal phosphates thereof, and metal sulfides thereof.

In some embodiments, the cathode in the electrochemical cell comprises a lithium metal oxide.

In some embodiments, the cathode in the electrochemical cell comprises $LiVPO_4F$ or $LiMn_2O_4$.

In some embodiments, the electrochemical cell is located in a rechargeable lithium battery.

In some embodiments, the electrochemical cell comprises an anode comprising lithium, a cathode comprising $LiMn_2O_4$, and an aqueous electrolyte comprising $LiN(SO_2CF_3)_2$ and $LiOSO_2CF_3$.

In some embodiments, the electrochemical cell comprises an anode comprising graphite, a cathode comprising $LiVPO_4F$, and an aqueous electrolyte comprising $LiN(SO_2CF_3)_2$ and $LiOSO_2CF_3$.

In some embodiments, the electrochemical cell comprises an anode comprising lithium, a cathode comprising $LiVPO_4F$, and an aqueous electrolyte comprising $LiN(SO_2CF_3)_2$ and $LiOSO_2CF_3$.

The present disclosure provides a process for preparing an anode for an electrochemical device comprising:
(a) providing an anode;
(b) coating the anode with a composition comprising at least one fluoride additive; and
(c) charging the anode to form an electrolyte interphase layer upon the anode that separates the anode from an aqueous electrolyte.

In some embodiments, the anode in the process comprises lithium metal, graphite, silicon, or a combination thereof.

In some embodiments, the anode in the process comprises lithium metal.

In some embodiments, the anode in the process comprises graphite.

In some embodiments, the anode in the process comprises silicon.

In some embodiments, the electrolyte interphase layer in the process is a decomposition product of at least one fluoride additive.

In some embodiments, the at least one fluoride additive in the process comprises an organic fluorinated hydrocarbon or an inorganic fluoride.

In some embodiments, the at least one fluoride additive in the process comprises a fluorinated ether.

In some embodiments, the at least one fluoride additive in the process comprises 1,1,2,2,-tetrafluoroethyl-2',2',2'-trifluoroethyl ether.

In some embodiments, the electrolyte interphase layer in the process comprises between about 0.05% and about 20% mass percentage of the at least one fluoride additive, wherein the mass percentage is measured by total mass of the fluoride additive and the aqueous electrolyte.

In some embodiments, the electrolyte interphase layer in the process covers between about 40% and about 100% of the surface area of the anode.

In some embodiments, the process comprises an anode comprising graphite and at least one fluoride additive comprising 1,1,2,2,-tetrafluoroethyl-2',2',2'-trifluoroethyl ether.

In some embodiments, the process comprises an anode comprising lithium metal and at least one fluoride additive comprising 1,1,2,2,-tetrafluoroethyl-2',2',2'-trifluoroethyl ether.

In some embodiments, the composition in (b) comprising at least one fluoride additive further comprises polyethylene oxide.

In some embodiments, an electrochemical device is obtained by a process of the present disclosure.

DETAILED DESCRIPTION OF THE INVENTION

Figure 1:
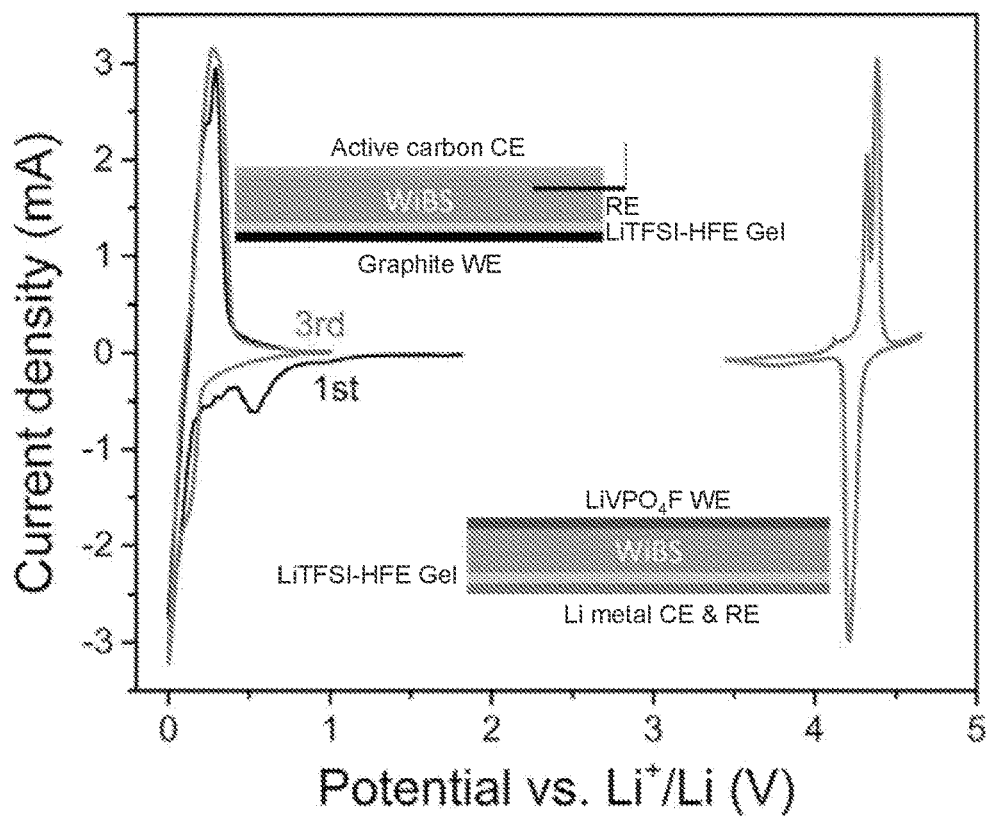
FIG. 1 are cyclic voltammograms with the left side showing a graphite anode pre-coated with a $LiN(SO_2CF_3)_2$—HFE gel ($LiN(SO_2CF_3)_2$ and 1,1,2,2-tetrafluoroethyl-2',2',2'-trifluoroether (HFE) with 10 wt % polyvinyl alcohol). Cyclic voltammetry was conducted in a $LiN(SO_2CF_3)_2$—$LiOSO_2CF_3$ gel electrolyte (21 mol/kg $LiN(SO_2CF_3)_2$ and 7 mol/kg $LiOSO_2CF_3$ in water mixed with 10 wt % polyvinyl alcohol) as the bulk electrolyte with an Ag/AgCl reference electrode and an active carbon counter electrode on the cathodic side. The right side shows a cyclic voltammogram of a $LiVPO_4$ cathode in a $LiN(SO_2CF_3)_2$—$LiOSO_2CF_3$ gel electrolyte with a reference electrode of lithium metal foil pre-coated with a $LiN(SO_2CF_3)_2$—HFE gel. The potential has been converted to $Li/Li^+$ reference. All cyclic voltammograms were obtained at the scanning rate of 0.5 mV/S.

As used herein, the singular terms "a" and "the" are synonymous and used interchangeably with "one or more" and "at least one," unless the language and/or context clearly indicates otherwise.

All numbers in this description indicating amounts, ratios of material, physical properties of materials and/or use are to be understood as modified by the word "about," except otherwise explicitly indicated.

The term "about" is used herein to mean the given number plus or minus 1 to 10%.

The term "aqueous electrolyte" as used herein, refers to an electrolyte composition that contains water as the only solvent.

The term "non-aqueous electrolyte" refers to an electrolyte composition that contains aprotic or protic solvents in which the content of water is less than 1%.

The term "cathode" is used herein to refer to the electrode where electrochemical reduction occurs during the discharging process.

The term "anode" is used herein to refer to the electrode where electrochemical oxidation occurs during the discharging process.

The "molality" (m) of a solution is defined as the amount of substance (in moles) of solute, $n_{solute}$, divided by the mass (in kg) of the solvent, $m_{solvent}$.

$$molality = n_{solute}/m_{solvent}$$

The unit for molality (m) is moles per kilogram (mol/kg).

In the present disclosure, the "cathodic challenge" was resolved by adopting an "inhomogeneous additive" approach, in which a fluorinated electrolyte additive is immiscible with an aqueous electrolyte but can be applied on graphite or Li metal surfaces as a thin coating of interphase precursor. The hydrophobicity of the precursor minimizes the competitive water reduction during the initial lithiation process of the anode, while its own reductive decomposition forms a unique composite interphase consisting of both organic and inorganic fluorides. Effective protection is provided by such an interphase for these high capacity low-potential anode materials and allows their coupling with different cathode materials, leading to 4.0 V aqueous LIBs with high efficiency and reversibility for the very first time. This new class of aqueous LIBs is expected to offer energy densities approaching those of non-aqueous LIBs, but with extreme safety, environmental-friendliness and even the possibility of adopting flexible and open cell configurations, none of which is available from non-aqueous LIBs.

More recently, ground-breaking efforts were made to expand this stability window of water by transplanting the solid-electrolyte-interphase (SEI) concept from non-aqueous electrolytes, so that the surfaces of those electrodes would be kinetically protected while operating beyond the above limits. That work had led to a new class of aqueous electrolytes, as represented by the so-called "water-in-salt" electrolytes (WiSE) named after its high salt concentration. WiSE and its many variations can form an ad hoc SEI on the anode during the initial charging, offering an electrochemical stability window of >3.0 V and enabling diversified aqueous battery chemistries with cell voltages and energy densities as high as 3.0 V and 200 Wh/kg, respectively. However, a significant gap still exists between these improved energy densities and what the state-of-the-art LIB can offer (400 Wh/kg). This gap mainly originates from the awkward positioning of the cathodic stability limits of these aqueous electrolytes, which, without exception, all situate between 1.7-1.9 V vs. Li, thus excluding the most energy-dense anode materials such as silicon, graphite and Li metal. On the other hand, most cathode materials are comfortably accommodated by the anodic stability limits (~4.90 V) of WiSE and its variations. By judicious selection of current collectors, even the so-called 5.0 V class cathode LiN$_{1.5}$Mn$_{1.5}$O$_2$ could be partially supported.

The above uneven positioning of cathodic and anodic limits in super-concentrated aqueous electrolyte stems from the preferential distribution of water molecules and salt anions at the inner-Helmholtz interface of electrode as potential is applied. Snapshots from molecular dynamics (MD) simulations reveal such unsymmetrical rearrangement of "water-in-bisalt" electrolyte (WiBS, i.e., aqueous solution of 21 m lithium bis(trifluoromethane)sulfonyl imide+7 m lithium trifluoromethane sulfonate) as the electrode is cathodically polarized. At 2.5 V vs. Li, LiN(SO$_2$CF$_3$)$_2$ and LiOSO$_2$CF$_3$ dominate the inner-Helmholtz layer, while water is almost excluded from direct contact with the graphite surface. Such an interfacial chemical composition favors the formation of an SEI mainly contributed by the reductive decomposition of these fluorinated salt anions. Anode materials with moderate lithiation or sodiation potentials (such as Mo$_6$S$_8$ or NaTi$_2$(PO$_4$)$_3$) would belong to this category, where LiF— or NaF-based SEIs have been observed. However, as potential is further polarized to 0.50 V, these anions experience increasing expulsion from a surface now negatively charged, and a large fraction of water molecules start to adsorb with hydrogens pointing towards the surface, making them readily available for hydrogen evolution reaction that become energetically favorable at this potential. Such interfacial structure disfavors the salt anion decomposition, and the SEI formation would be severely interfered by the hydrogen evolution. Anode materials with lithiation potentials below 0.5 V (such as silicon, graphite, and lithium metal) belong to this category, which faces the severe "cathodic challenge" that cannot be simply resolved by increasing salt concentrations.

Hence, in order to render an aqueous LIB competitive in energy density against the state-of-the-art LIB, one must resolve this "cathodic challenge" of more than a 1.5 V gap via additional protection. An effective strategy would be the minimization of water molecules at anode surface before the SEI forms. In the present disclosure, this challenge was met with an "inhomogeneous SEI additive" strategy. Such an additive is immiscible with a WiSE but can be applied as a thin coating in the form of a gel on the surface of either graphite or Li metal. Due to its strongly hydrophobic nature it expels water molecules from the anode surface, thus minimizing the competing water decomposition during the initial forming cycle, thus allowing the formation of a conformal and dense interphase. Upon lithiation of the anode, this inhomogeneous additive decomposes into an SEI rich in both inorganic LiF and organic C—F species, which for the first time enables the reversible cycling of these anode materials in aqueous electrolytes.

Apparently, the ad hoc interphases originated alone from WiSE or its improved derivatives can only protect the anode materials that operate at relatively high potentials such as $Mo_6S_8$, $Li_4Ti_5O_{12}$, anatase $TiO_2$, or $NaTi_2(PO_4)_3$. Although graphite or Li metal cannot be stably cycled in WiSE, its reactivity toward these anode materials has been extremely low due to the significantly reduced water activity at such high salt concentrations. Such reactivity is even further reduced when an improved WiSE is "solidified" with the formation of a hydrogel with either polyvinyl alcohol (PVA) or polyethylene oxide (PEO). However, any attempt to cycle graphite or Li metal in these gel-WiSE still failed, because of the above-mentioned "cathodic challenge", which creates a gap of more than 1.5 V between the cathodic limit of WiSE (−1.7 V vs Li) and the working potentials of either graphite (−0.1 V vs Li) or Li metal (0 V vs Li). Water decomposition driven by the interfacial structure cannot be kinetically suppressed by an SEI because its formation from the reduction of TFSl or OTF is now disfavored and has to compete with hydrogen evolution. Employing super-concentration to fight the "cathodic challenge" is neither realistic nor effective, because of the concerns over viscosity, cost, and solubility limits. In fact, WiBS and hydrate melt (both with ~28 m salt) have nearly reached their saturation limits, but the widening of the electrochemical stability window is rather inconsequential as compared with the original WiSE, as dictated by the need to counter such a undesired preference, such as interphase-forming additive.

In non-aqueous electrolytes, interphase-forming additives were customarily employed to strengthen the chemical durability of these SEIs, and their selection criteria sually centered around their capability of being preferentially reduced before bulk electrolyte components. However, application of the additive practice to aqueous electrolytes has to be subject to a number of new constraints here. First of all, as the precursor of an additional interphase, the additive must be chemically stable against WiSE or gel-WiSE. Secondly, it must be electrochemically unstable so that it can release the interphase ingredient on demand. Thirdly and most importantly, the precursor should effectively exclude water molecules from the surface of these anode materials, so that the interfacial favor on hydrogen evolution would be effectively countered. In other words, such an additive should be ideally phase-separated from WiSE before decomposition, which significantly differs from conventional additives that are well miscible with the bulk non-aqueous electrolytes. Finally, considering that the aqueous SEIs successfully formed so far for either Li-ion or Na-ion chemistries mainly consist of fluoride salts (LiF or NaF) as the consequence of TFSI reduction, which are ingredients most likely insoluble in aqueous media, the precursor should contain a rich fluoride source. The combination of the above constraints rules out most additives similar to non-aqueous electrolytes, such as sultones, phosphates, borates or any compounds with labile fluoride bonds, because they are either susceptible to hydrolysis, or form products that are soluble in water, or are immiscible with WiSE so that the initial formation chemistry of the additional interphase has to compete with hydrogen evolution, resulting in low efficiency and a highly porous interphase that will poorly adhere to the anode surface.

The present disclosure relates to a method for stabilizing the interface between an anode and an aqueous electrolyte by the formation of a solid electrolyte interface (SEI) in the aqueous system. In LIBs, the anode will usually suffer from reactions between the active material and dissolved oxygen, dissolution of the surface element, and decomposition of the electrolyte. The stability of the high voltage anode in the aqueous electrolyte will decrease at higher cut-off voltage and therefore, the interfacial stability between the anode and the aqueous electrolyte should be addressed in order to achieve a high energy aqueous battery. Thus, the present disclosure uses a fluoride additive in the aqueous electrolyte to form a SEI on the anode surface.

In some embodiments, the present disclosure provides mixtures of the fluoride additive and an anode active material, anodes containing the fluoride additive, electrochemical cells with anodes containing the fluoride additive, rechargeable batteries with anodes containing the fluoride additive, and methods of forming a solid electrolyte interface on an anode.

Anode

In some embodiments, the present disclosure provides a composition comprising:
 (a) an anode;
 (b) an aqueous electrolyte; and
 (c) an electrolyte interphase layer;
wherein the electrolyte interface interphase layer covers the anode and separates it from the aqueous electrolyte.

In some embodiments, the anode comprises at least one anode active material. In some embodiments, the anode active material comprises lithium metal, graphite, or silicon. In some embodiments, the anode active material comprises lithium metal. In some embodiments, the anode active material comprises graphite. In some embodiments, the anode active material comprises silicon. In some embodiments, the anode active material comprises lithium metal and graphite.

In some embodiments, the anode comprises more than one anode active material. In some embodiments, the anode comprises 1, 2, 3, or 4 anode active materials. In some embodiments, the anode comprises 1 anode active material.

In some embodiments, the anode comprises other materials in addition to the anode active material including a metal sheet, a binder, a conductivity enhancer, and combinations thereof. In some embodiments, the anode further comprises a binder. In some embodiments, the anode further comprises a polyvinylidene fluoride binder.

Fluoride Additive

In some embodiments, the present disclosure provides a composition comprising:
 (a) an anode;
 (b) an aqueous electrolyte; and
 (c) an electrolyte interphase layer;
wherein the electrolyte interphase layer covers the anode and separates it from the aqueous electrolyte, and wherein the electrolyte interphase layer is a decomposition product of at least one fluoride additive.

In some embodiments, the fluoride additive is a compound that can form a film on the surface of the active anode material. In some embodiments, the fluoride additive possesses the following properties: (1) the fluoride additive must be chemically stable against aqueous electrolytes and aqueous gel electrolytes; (2) the fluoride additive must be electrochemically unstable so that it can release the interphase ingredient on demand; (3) the fluoride additive should effectively exclude water molecules from the surface of the active anode material, so that the interfacial favor on hydrogen evolution would be effectively countered—in other words, such an additive should be ideally phase-separated from an aqueous electrolyte or aqueous gel electrolyte before decomposition, which significantly differs from conventional additives that are miscible with the bulk non-aqueous electrolytes; and (4) the fluoride additive should contain a rich fluoride source since fluoride salts are generally soluble in aqueous media.

In some embodiments, the at least one fluoride additive comprises an organic fluorinated hydrocarbon or an inorganic fluoride.

In some embodiments, the at least one fluoride additive comprises a fluorinated ether.

In some embodiments, the at least one fluoride additive comprises 1,1,2,2,-tetrafluoroethyl-2',2',2'-trifluoroethyl ether.

In some embodiments, the amount of the at least one fluoride additive as a mass percentage of the electrolyte interphase layer is between about 0.05% and about 20%, about 0.05% and about 10%, about 0.05% and about 5%, about 0.05% and about 2%, about 0.05% and about 1%, about 0.05% and about 0.5%, about 0.05% and about 0.1%, about 0.1% and about 20%, about 0.1% and about 10%, about 0.1% and about 5%, about 0.1% and about 2%, about 0.1% and about 1%, about 0.1% and about 0.5%, about 0.5% and about 20%, about 0.5% and about 10%, about 0.5% and about 5%, about 0.5% and about 2%, about 0.5% and about 1%, about 1% and about 20%, about 1% and about 10%, about 1% and about 5%, about 1% and about 2%, about 2% and about 20%, about 2% and about 10%, about 2% and about 5%, about 5% and about 20%, about 5% and about 10%, or about 10% and about 20%. In some embodiments, the at least one fluoride additive as a mass percentage of the electrolyte interphase layer is between about 0.5% and about 2%.

In some embodiments, the fluoride additive decomposes in the aqueous electrolyte and forms a solid electrolyte interphase layer on the anode active material. In some embodiments, the solid electrolyte interphase layer covers between about 40% and about 100%, about 40% and about 90%, about 40% and about 80%, about 40% and about 60%, about 60% and about 100%, about 60% and about 90%, about 60% and about 80%, about 80% and about 100%, about 80% and about 90%, or about 90% and about 100% of the surface area of the anode active material.

In some embodiments, when the fluoride additive is added to an anode active material, the fluoride additive provides an initial reversible capacity increase corresponding to at least 50%, at least 60%, at least 70%, or at least 80% of the fluoride additive theoretical capacity of the fluoride additive.

Cathode

In some embodiments, the cathode comprises at least one cathode active material. In some embodiments, the cathode active material comprises a metal selected from the group consisting of ferrate, iron oxide, cuprous oxide, iodate, cupric oxide, mercuric oxide, cobaltic oxide, manganese dioxide, lead oxide, oxygen, lithium oxide, nickel oxyhydroxide, nickel dioxide, silver peroxide, permanganate, and bromate.

In some embodiments, the cathode comprises a lithium metal oxide. In some embodiments, the cathode comprises a lithium metal phosphate. A lithium metal oxide or lithium metal phosphate is a composite of lithium oxide or lithium phosphate with a transition metal. In some embodiments, the cathode comprises a lithium metal oxide comprising Ni, Co, Mn, or Fe as the transition metal. In some embodiments, the cathode comprises a lithium metal phosphate comprising Ni, Co, Mn, or Fe as the transition metal. In some embodiments, the cathode comprises a lithium metal oxide comprising Ni, Co, or Mn as the transition metal. In some embodiments, the cathode comprises a lithium metal oxide comprising Ni, Co, or Mn as the transition metal.

In some embodiments, the cathode active material is selected from the group consisting of $LiCoO_2$, $LiNi_{0.33}Mn_{0.33}Co_{0.33}O_2$, $LiNi_{0.5}Mn_{1.5}O_2$, $LiCoPO_4$, $LiNiPO_4$, $LiVPO_4F$, metal oxides, metal phosphates, conversion-reaction materials based on metal oxides, metal halides, and metal sulfides. In some embodiments, the cathode active material is selected from the group consisting of $LiFePO_4$, $LiMn_2O_4$, $LiCoO_2$, $LiVPO_4F$, $LiNi_{0.33}Mn_{0.33}Co_{0.33}O_2$, $LiNi_{0.6}Mn_{0.2}Co_{0.2}O_2$, $LiNi_{0.8}Mn_{0.1}Co_{0.01}O_2$, $LiNi_{0.5}Mn_{0.5}O_4$, $LiNi_{0.8}Co_{0.15}Al_{0.05}O_2$, and $LiMnPO_4$. In some embodiments, the cathode comprises $LiVPO_4F$. In some embodiments, the cathode comprises $LiMn_2O_4$.

In some embodiments, the cathode comprises more than one cathode active material. In some embodiments, the cathode comprises 1, 2, 3, or 4 cathode active materials. In some embodiments, the cathode comprises 1 cathode active material.

In some embodiments, the cathode comprises other materials in addition to the cathode active material including a metal sheet, a binder, a conductivity enhancer, and combinations thereof. In some embodiments, the cathode further comprises a binder. In some embodiments, the cathode further comprises a polyvinylidene fluoride binder.

Electrochemical Cells

An electrochemical cell comprises two half-cells. Each half-cell comprises an electrode and an electrolyte. The two half-cells can use the same electrolyte, or they can use different electrolytes. The chemical reactions in the cell may involve the electrolyte, the electrodes, or an external substance (as in fuel cells that may use hydrogen gas as a reactant). In a full electrochemical cell, species from one half-cell lose electrons (oxidation reaction) to their electrode while species from the other half-cell gain electrons (reduction reaction) from their electrode.

An electrochemical cell includes two electrodes, a positive electrode, called the cathode and, a negative electrode, called the anode, an insulator separating the electrodes so the battery does not short out, and an electrolyte that transports the ionic component of the chemical reaction between the two electrodes and forces the electronic component to be transported outside the cell. The anode is the reductant of the chemical reaction, the cathode the oxidant, so on discharge electrons flow from the anode to the cathode and are charge-compensated by cations flowing inside the cell from the anode to the cathode. This process transforms the chemical energy of the reaction into electric power in the external circuit by delivering a current at a voltage for a time $A_t$ until the chemical reaction is completed. If the charged cell has the electric current cut off, which is called an open-circuit, electrons cannot flow, but the ions inside the cell can flow without being charge-compensated. As a result, the cathode becomes positively charged on open-circuit, which is why the cathode is called the positive electrode.

In some embodiments, the present invention provides an electrochemical cell comprising:
(a) an anode;
(b) a cathode;
(c) an electrolyte interphase layer; and
(d) an aqueous electrolyte;
wherein the electrolyte interphase layer covers the anode and separates it from the aqueous electrolyte.

The electrolyte used in the electrochemical cell can be any electrolyte suitable for use at the voltage dictated by the cathode and the anode. In some embodiments, the anode and cathode cell contain the same electrolyte. In some embodiments, the anode and cathode cell contain different electrolytes.

In some embodiments, the electrolyte is an aqueous electrolyte. In some embodiments, a significant (non-trace) amount of water is incorporated in the electrolyte. In some embodiments the volume percent of water in the electrolyte relative to the total liquid solvent volume is greater than 5%, 10%, 20%, 30%, 40%, 50%, 60%, 70%, 80%, or 90%. In some embodiments water is the only liquid solvent in the electrolyte (i.e., water constitutes 100% of the solvent volume of the electrolyte). In some embodiments, the aqueous electrolyte comprises $LiN(SO_2CF_3)_2$ or $LiOSO_2CF_3$.

In some embodiments, the aqueous electrolyte is a water-in-salt electrolyte. As used herein, the term "water-in-salt" means that the weight ratio of salt to solvent or volume ratio of salt to solvent exceed 1.0. In some embodiments, the weight or volume of salt is more than solvent. In some embodiments, the water-in-salt electrolyte is a sulfone-based electrolyte such as $LiN(SO_2CF_3)_2$(LiTFSI), $LiN(SO_2CH_3)_2$, $LiN(SO_2C_4H_9)_2$, $LiN(SO_2C_2F_5)_2$ (LiBETI), $LiN(SO_2C_4F_9)_2$, $LiN(SO_2F_3)(SO_2C_4F_9)$, $LiN(SO_2C_2F_5)(SO_2C_4F_9)$, $LiN(SO_2C_2F_4SO_2)$, $LiN(SO_2F)_2$ (LiFSI), $LiOSO_2CF_3$, or $LiN(SO_2F)(SO_2CF_3)$ (LiFTI). In some embodiments, the aqueous electrolyte comprises $LiN(SO_2CF_3)_2$. In some embodiments, the aqueous electrolyte is a water-in-Mg-salt electrolyte. In some embodiments, the water-in-Mg-salt electrolyte comprises $LiSO_4$—$MgSO_4$, $LiCl$—$MgCl_2$, or $Li(NO_3)$—$Mg(NO_3)_2$.

In some embodiments, the electrochemical cell includes a separator between the positive electrode and the negative electrode. In some embodiments, the separator is subjected to hydrophilic treatment or perforated such that the separator can be permeated with an aqueous electrolyte solution, allowing ions to pass through the separator. The separator may be any separator that is commonly used in batteries. Examples of the separator include polymer nonwoven fabrics, such as polypropylene nonwoven fabric and poly(phenylene sulfide) nonwoven fabric, and macroporous membranes of olefin resins, such as polyethylene and polypropylene. These can be used alone or in combination. In some embodiments, the separator is a glass fiber.

Electrochemical Devices

In some embodiments, electrochemical devices that operate using oxidative additives are fabricated using techniques known to those of ordinary skill in the art. In some embodiments, the electrochemical device is a battery.

Batteries are divided into two principal types, primary batteries and secondary batteries. Primary batteries are used once and are then exhausted. Secondary batteries are also often called rechargeable batteries because, after use, they may be recharged, then used again. In rechargeable batteries, each charge/discharge process is called a cycle. Rechargeable batteries eventually reach an end of their usable life, but typically only after many charge/discharge cycles.

A rechargeable battery includes an electrochemical cell and optionally other materials, such as a casing to protect the cell and wires or other connectors to allow the battery to interface with the outside world.

The cation that is transported between the electrodes by the electrolyte is called the "working ion." A rechargeable battery is named after the working cation. For example, the positive ion in a lithium secondary battery is the lithium ion ($Li^+$). In a sodium secondary battery it is the sodium ion ($Na^+$).

To recharge the battery, electrons flow from the cathode to the anode by the application of electric power. By supplying electric energy to the battery, electrons are induced to leave the cathode and enter the anode. To keep the overall charge neutral in the cathode and anode, a positive ion leaves the cathode and enters the electrolyte, and a positive ion also leaves the electrolyte and enters the anode. The efficiency of electrical-energy storage in a rechargeable battery depends on the reversibility of the chemical reaction between the two electrodes.

Because the ionic conductivity in the electrolyte is many times smaller than the electronic conductivity in the electrode, a battery has large-area electrodes that are separated by a thin electrolyte. Therefore, the electrodes do not need to be thick, and, their electronic conductivity does not need to be high so long as they make contact with a metallic current collector. Consequently, in addition to containing an active material that exchanges electrons and ions, anodes and cathodes may contain other materials in addition to a metal backing to which a slurry of the active material is applied and dried. The slurry often contains, in addition to the active material, a binder to help it adhere to the backing and conductive materials, such as carbon particles. Once the slurry dries, it forms a coating on the metal backing.

The present disclosure also provides methods of manufacture of the aqueous electrolyte battery. In some embodiments, the method involves de-oxygenating the electrolyte and forming and sealing the cell in an inert or reducing environment devoid of molecular oxygen (e.g., a nitrogen environment) in order to reduce or eliminate free oxygen in the electrolyte solution. In this way the irreversible oxidation in the aqueous electrolyte and the resultant loss of material, is avoided.

In some embodiments, the cells are self-contained and sealed in a hermetic casing wherein the entirety of the cell is derived from and disposed in the casing during cell manufacture. These fully sealed cells may be secondary cells. In some embodiments, the casing comprises one layer. In some embodiments, the casing comprises more than one layer. In some embodiments, the casing comprises at least one layer selected from a polyethylene terephthalate layer, a polymer layer, and a propylene layer. In some embodiments, the casing comprises at least one carbonized plastic layer.

In some embodiments, the cells are configured in a battery flow cell system, wherein the aqueous electrolyte is caused to flow and/or circulate into the cell. In some embodiments, the aqueous electrolyte is caused to flow and/or circulate through an inter-electrode region between the anode and the cathode. In some embodiments, the electrolyte in the anode and the cathode are flowable and during operation are caused to flow through the cell.

In some embodiments, the aqueous electrolyte battery can be of any shape, such as coin-shaped, button-shaped, sheet-shaped, layered, cylindrical, flat, or square. In some embodiments, the aqueous secondary battery can be applied to large objects, such as electric vehicles.

In some embodiments, the aqueous electrolyte battery is a secondary battery. In some embodiments, the secondary battery can include a single electrochemical cell or multiple electrochemical cells. Batteries with more than one cell may contain components to connect or regulate the multiple electrochemical cells.

Several important properties of rechargeable batteries include energy density, power density, capacity, particularly reversible capacity, rate capability, cycle life, thermal stability, cost, and safety. All of these properties are influenced by the choice of materials used to form the battery. The capacity of a battery is the amount of electronic charge that is transported at a constant current between the electrodes per unit weigh in the time $A_t$ for a complete discharge, and the energy density is the product of the average voltage during discharge and the capacity. Both decrease with increasing current and, therefore, power delivered. Moreover, the cycle life of a rechargeable battery is defined as the number of charge/discharge cycles before the capacity fades to 80% of its original capacity. Capacity fade is caused by a loss of the reversibility of the chemical reaction between the electrodes.

In some embodiments, battery performance can be quantified with four parameters: cell voltage, capacity, Coulombic efficiency, and cycling stability. While the first two determine the energy density, the latter two dictate the life and energy efficiency.

The "energy density" of a battery is the nominal battery energy per unit mass (Wh/kg). The energy density is the ability of a battery to store energy, i.e., a high energy density can store a lot of energy than a low energy density battery.

In some embodiments, the energy density for the battery at a low C-rate of 0.5 C is between about 20 Wh/kg and about 200 Wh/kg, about 20 Wh/kg and about 150 Wh/kg, about 20 Wh/kg and about 120 Wh/kg, about 20 Wh/kg and about 90 Wh/kg, about 20 Wh/kg and about 60 Wh/kg, about 60 Wh/kg and about 200 Wh/kg, about 60 Wh/kg and about 150 Wh/kg, about 60 Wh/kg and about 120 Wh/kg, about 60 Wh/kg and about 90 Wh/kg, about 90 Wh/kg and about 200 Wh/kg, about 90 Wh/kg and about 150 Wh/kg, about 90 Wh/kg and about 120 Wh/kg, 120 Wh/kg and about 200 Wh/kg, about 120 Wh/kg and about 150 Wh/kg, or about 150 Wh/kg and about 200 Wh/kg. In some embodiments, the energy density for the battery at a low C-rate of 0.5 C is between about 120 Wh/kg and about 150 Wh/kg.

The "cycle life" of a battery is the number of complete charge/discharge cycles that the battery is able to support before its capacity falls under 80% of its original capacity. The "C-rate" of a battery is a measure of the rate at which a battery is being discharged. A C-rate of 1 C is a one-hour discharge, a C-rate of 0.5 C is a two-hour discharge, and a C-rate of 0.2 C is a five-hour discharge.

In some embodiments, the number of cycles for the battery at a high C-rate of about 2.5 C is between about 10 and about 2000, about 10 and about 1500, about 10 and about 1000, about 10 and about 500, about 10 and about 100, about 100 and about 2000, about 100 and about 1500, about 100 and about 1000, about 100 and about 500, about 500 and about 2000, about 500 and about 1500, about 500 and about 1000, about 1000 and about 2000, about 1000 and about 1500, or between about 1500 and about 2000. In some embodiments, the number of cycles for the battery at a high C-rate of about 2.5 C is between about 10 and about 500.

The "capacity retention" of a battery is a measurement of the fraction of full capacity available from a battery under a specified set of conditions, after the battery has been stored for a given amount of time.

In some embodiments, the capacity decay rate (in mAh/g) for a battery at a high C-rate of about 2.5 C is between about 0.005% and about 0.1%, about 0.005% and about 0.05%, 0.005% and about 0.01%, about 0.01% and about 0.1%, about 0.01% and about 0.05%, or about 0.05% and about 0.01% per cycle. In some embodiments, the capacity decay rate (in mAh/g) for a battery at a high C-rate of about 2.5 C is between about 0.05% and about 0.01% per cycle.

In some embodiments, the capacity retention (in mAh/g) for a battery at a low C-rate of about 0.5 C is between about 30% and about 100%, about 30% and about 90%, about 30% and about 80%, about 30% and about 70%, about 30% and about 60%, about 60% and about 100%, about 60% and about 90%, about 60% and about 80%, about 60% and about 70%, about 70% and about 100%, about 70% and about 90%, about 70% and about 80%, about 80% and about 100%, about 80% and about 90%, or about 90% and about 100%. In some embodiments, the capacity retention (in mAh/g) for a battery at a low C-rate of about 0.5 C is between about 90% and about 100%.

In some embodiments, the number of cycles for the battery at a high C-rate of about 2.5 C is between about 10 and about 2000, about 10 and about 1500, about 10 and about 1000, about 10 and about 500, about 10 and about 100, about 100 and about 2000, about 100 and about 1500, about 100 and about 1000, about 100 and about 500, about 500 and about 2000, about 500 and about 1500, about 500 and about 1000, about 1000 and about 2000, about 1000 and about 1500, or between about 1500 and about 2000. In some embodiments, the number of cycles for the battery at a high C-rate of about 2.5 C is between about 500 and about 2000.

In some embodiments, the electrochemical cell operates at a temperature of less than about 100° C., about 90° C., about 80° C., about 70° C., about 60° C., about 50° C., about 40° C., about 30° C., about 20° C., or about 10° C. In some embodiments, the electrochemical cell operates at a temperature between about −40° C. and about 100° C., about −40° C. and about 90° C., about −40° C. and about 80° C., about −40° C. and about 70° C., about −40° C. and about 60° C., about −40° C. and about 50° C., about −40° C. and about 40° C., about −40° C. and about 30° C., about −30° C. and about 100° C., about −30° C. and about 90° C., about −30° C. and about 80° C., about −30° C. and about 70° C., about −30° C. and about 60° C., about −30° C. and about 50° C., about −30° C. and about 40° C., about −30° C. and about 30° C., about −20° C. and about 100° C., about −20° C. and about 90° C., about −20° C. and about 80° C., about −20° C. and about 70° C., about −20° C. and about 60° C., about −20° C. and about 50° C., about −20° C. and about 40° C., or about −20° C. and about 30° C.

In some embodiments, the electrochemical cell has a fuel cell output voltage greater than 2.5 V. In some embodiments, the electrochemical cell has a fuel cell output voltage greater than 4.0 V. In some embodiments, the electrochemical cell has a fuel cell output voltage between 2.0 V and 5.0 V, 2.0 V and 4.5 V, 2.0 V and 4.0 V, 2.0 V and 3.5 V, 2.0 V and 3.0 V, 2.0 V and 2.5 V, 2.5 V and 5.0 V, 2.5 V and 4.5 V, 2.5 V and 4.0 V, 2.5 V and 3.5 V, 2.5 V and 3.0 V, 3.0 V and 5.0 V, 3.0 V and 4.5 V, 3.0 V and 4.0 V, 3.0 V and 3.5 V, 3.5 V and 5.0 V, 3.5 V and 4.5 V, or 3.5 V and 4.0 V, 4.0 V and 5.0 V, 4.0 V and 4.5 V, and 4.5 V and 5.0 V. In some embodiments, the electrochemical cell has a fuel cell output voltage between 3.5 V and 4.5 V.

The following examples are illustrative and non-limiting of the electrochemical cells, methods of making, and methods of using described herein. Suitable modifications and adaptations of the variety of conditions, formulations and other parameters normally encountered in the field and which are obvious to those skilled in the art in view of this disclosure are within the spirit and scope of the invention.

EXAMPLES

Example 1

A LiN(SO$_2$CF$_3$)$_2$—LiOSO$_2$CF$_3$ aqueous electrolyte was prepared by dissolving 21 mol/kg of lithium bis(trifluoromethane sulfonyl) imide (LiN(SO$_2$CF$_3$)$_2$, LiTFSI, >98%, Tokyo Chemical Industry) in water (HPLC grade) and then adding an additional 7 mol/kg of lithium trifluoromethane sulfonate (LiOSO$_2$CF$_3$, LiOTf, ~99.996%, Sigma-Aldrich). A LiN(SO$_2$CF$_3$)$_2$—LiOSO$_2$CF$_3$ aqueous gel electrolyte was prepared by adding 10 wt % of polyvinyl alcohol (PVA, Sigma-Aldrich) to the LiN(SO$_2$CF$_3$)$_2$—LiOSO$_2$CF$_3$ aqueous electrolyte and then heating at 95° C. for 5 hours under vigorous stirring. A LiN(SO$_2$CF$_3$)$_2$—HFE gel was prepared by mixing a volume ratio of 95:5 of 1,1,2,3,-tetrafluoroethyl-2',2',2'-trifluoroethyl ether (HFE) (Daikin America) in dimethyl carbonate (DMC) with 0.5 M LiN(SO$_2$CF$_3$)$_2$ and 10 wt % of polyethylene oxide (PEO, Sigma-Aldrich) and heating at 70° C. for 20 minutes under stirring. The graphite anodes were coated on Cu foil with a weight ratio of 90% of graphite (KS44) and 10% polyvinylidene fluoride binder (PVDF). The LiVPO$_4$F and LiMn$_2$O$_4$ cathode electrodes were coated on Al foil with a weight ratio of 80% of active materials, 10% carbon black, and 10% PVDF. The three-electrode cyclic voltammetry (CV) test of graphite and moisture-content measurement were made using glass-bottle-like cells. The graphite electrode was pre-coated with a LiN(SO$_2$CF$_3$)$_2$—HFE gel layer and then immersed into the LiN(SO$_2$CF$_3$)$_2$—LiOSO$_2$CF$_3$ aqueous gel electrolyte. The counter electrode (LiVPO$_4$F or active carbon) and Ag/AgCl reference electrode were in-positioned in the LiN(SO$_2$CF$_3$)$_2$—LiOSO$_2$CF$_3$ aqueous gel electrolyte. CV was carried out using a CHI 600E electrochemical work station. The two-electrode test cells were assembled as Swagelok cells using either LiVPO$_4$F or LiMn$_2$O$_4$ as cathode, graphite or Li metal as anode, and LiN(SO$_2$CF$_3$)$_2$—LiOSO$_2$CF$_3$ aqueous gel electrolyte sandwiched in between as electrolyte in the absence of a separator. Before assembly, the whole anode side—which includes both active material (graphite) and current-collector—were coated by the LiN(SO$_2$CF$_3$)$_2$—HFE gel so that the LiN(SO$_2$CF$_3$)$_2$—LiOSO$_2$CF$_3$ aqueous gel electrolyte does not contact any part of the anode directly.

The cells were cycled galvanostatically on a Land BT2000 battery test system (Wuhan, China) at room temperature. To measure the moisture content, the LiN(SO$_2$CF$_3$)$_2$—HFE gel was exposed to the LiN(SO$_2$CF$_3$)$_2$—LiOSO$_2$CF$_3$ aqueous gel electrolyte at equilibrium, then a certain amount of the LiN(SO$_2$CF$_3$)$_2$—HFE gel was taken out and diluted by tetrahydrofuran (THF) at regular intervals for moisture-content evaluation using a Coulometer (Metrohm 899).

X-ray photoelectron spectroscopy was performed on a PHI Versaprobe 3 instrument with monochromated Al Kα source that produces radiation at hv=1486 eV. The analyzed area of the sample was 100 μm×100 μm. High resolution scans of lithium (Li) 1s, carbon (C) 1s, oxygen (O) 1s, and fluorine (F) 1s regions were collected with a constant pass energy of 55.0 eV and a dwell step time of 100 ms while under charge neutralization to reduce differential charging. Sample spectra were calibrated to the C 1s signal for C—C occurring at 284.8 eV. Raw data curve fitting and deconvolution was performed using the Multipak software package. Curves were fit using a Shirley-type background, and symmetrical peaks of 90-100% Gaussian character. Full width at half maximum (FWHM) was fixed for all deconvoluted peaks within each high resolution element scan.

Thermals scans for chemical stability and vapor pressure were performed using a differential scanning calorimeter (DSC, TA Instruments, Model MDSC 2920). For vapor pressure, a special aluminum sample lid (Perkin-Elmer, N519-0788) with a pinhole of 50 m diameter replaced the usual lid, and calibration was done with the boiling points of water (100° C.) and n-decane (174.15° C.). For chemical stability, an aluminum sample pan and lid (Perkin Elmer, 2190062) were used to hermetically seal about 10 mg of electrolyte and a small piece of an electrode on a substrate using a crimper (Perkin Elmer, 2190061). These samples were left at either room temperature or 50° C. for at least 15 hours for proper wetting of the enclosed electrode materials before they were heated up on the differential scanning calorimeter at the rate of 5° C. per minute until the sample burst, which occurs nominally at around 2 atm. Calibration for this part of the experiment was done with the melting points of cyclohexane (6.54° C.), indium (156.6° C.), and tin (231.88° C.).

In order to provide insight into the interfacial structure of the aqueous electrolyte at the graphite electrodes, molecular dynamics simulations were performed on the aqueous electrolyte solution at 363 K. A higher temperature was chosen to facilitate equilibration of the interfacial structure on the simulation timescale. The simulation cell was comprised of 192 LiN(SO$_2$CF$_3$)$_2$, 64 LiOSO$_2$CF$_3$, and 512 water molecules that were confined between two graphite electrodes with their basal plane in contact with an electrolyte. Molecular dynamic simulations were performed utilizing a modified version of the CHARMM polarizable force field for water in conjunction with the Atomistic Polarizable Potential for Liquids, Electrolytes, & Polymers (APPLE&P) many-body polarizable force field parameters for ion/ion and ion/water interactions. The functional form of the APPLE&P force field is discussed in Borodin, O., *J. Phys. Chem. B* 113: 11463-11478 (2009).

A constant potential methodology that accounts for electrode polarization and solvent from the electrolyte was used. While this methodology is often used for voltages from 0 V to 5 V applied between the two graphite electrodes, the analysis was on the negative electrode with potentials of −2.5 V to −0.5 V versus the bulk electrolyte after a potential of zero change (PZC=−0.57) was subtracted. Assuming that PZC is close to the experimentally measured open circuit voltage of 3 V versus Li/Li$^+$, these potentials correspond to 0.5 V and 2.5 V versus Li/Li$^+$. The short range interactions such as repulsion and dispersion were truncated beyond 12 angstroms, while the reciprocal part of smooth particle mesh Ewald (SPME) was calculated in two dimensions. A Nose Hoover thermostat was used to control the temperature.

Example 2

Figure 15:
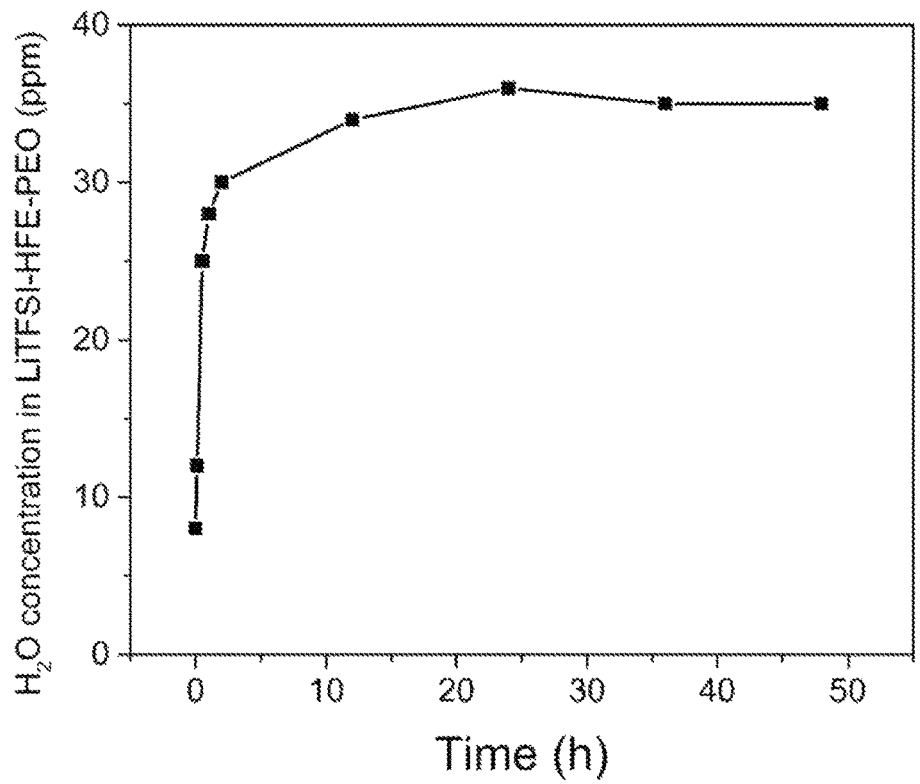
FIG. 15 is a graph of the time dependence of the moisture-content of a $LiN(SO_2CF_3)_2$—HFE gel after exposure to a $LiN(SO_2CF_3)_2$—$LiOSO_2CF_3$ gel electrolyte.

Upon mixing with 0.5 M lithium bis(trifluoromethane sulfonyl) imide LiN(SO$_2$CF$_3$)$_2$, HFE forms a translucent gel in the presence of 10 wt % of polyethylene oxide at 70° C. (LiN(SO$_2$CF$_3$)$_2$—HFE gel) which remains phase-separated from either the LiN(SO$_2$CF$_3$)$_2$—LiOSO$_2$CF$_3$ aqueous electrolyte the LiN(SO$_2$CF$_3$)$_2$—LiOSO$_2$CF$_3$ aqueous gel electrolyte. Due to the sluggish dissolution process of LiN(SO$_2$CF$_3$)$_2$ in HFE, ca. 5% dimethyl carbonate (DMC) was sometimes added to assist in the gel formation. Most of the DMC (boiling temperature 90° C.) was then evaporated, leaving the translucent gel which is immiscible with the $LiN(SO_2CF_3)_2$—$LiOSO_2CF_3$ aqueous electrolyte. Fourier-transform infrared spectroscopy (FTIR) cannot detect any residual DMC in this $LiN(SO_2CF_3)_2$—HFE gel. On the other hand, $LiN(SO_2CF_3)_2$ solution in neat DMC mixes well with either a $LiN(SO_2CF_3)_2$—$LiOSO_2CF_3$ aqueous electrolyte or a $LiN(SO_2CF_3)_2$—$LiOSO_2CF_3$ aqueous gel electrolyte. The extremely hydrophobic nature of the $LiN(SO_2CF_3)_2$—HFE gel is well demonstrated by its complete immiscibility with a $LiN(SO_2CF_3)_2$—$LiOSO_2CF_3$ aqueous electrolyte or with a $LiN(SO_2CF_3)_2$—$LiOSO_2CF_3$ aqueous gel electrolyte, as well as its moisture-content of ~35 ppm at equilibrium after exposure to a $LiN(SO_2CF_3)_2$—$LiOSO_2CF_3$ aqueous electrolyte for 50 hours (FIG. 15). Such a low-moisture level is acceptable even by non-aqueous electrolyte standard, which should not interfere with the effective interphase formation reaction on graphite surfaces and the reversible $Li^+$-intercalation/de-intercalation. Both a $LiN(SO_2CF_3)_2$—$LiOSO_2CF_3$ aqueous electrolyte and a $LiN(SO_2CF_3)_2$—$LiOSO_2CF_3$ aqueous gel electrolyte display complete inertness toward Li metal.

Pre-coating a graphite electrode or a Li metal foil with a thin-layer of $LiN(SO_2CF_3)_2$—HFE gel enables the stable cycling of these anode materials in a $LiN(SO_2CF_3)_2$—$LiOSO_2CF_3$ aqueous gel electrolyte without apparent hydrogen evolution. FIG. 1 displays the cyclic voltammetry (CV) performed on such a protected graphite electrode in a $LiN(SO_2CF_3)_2$—$LiOSO_2CF_3$ aqueous gel electrolyte. A minor peak appears in the first cathodic scan at ~0.70 V, which could be caused by SEI formation from mixed reductions of HFE, $LiN(SO_2CF_3)_2$, and trace residual DMC, but it disappears in the following scans, reminiscent of the irreversible process associated with the interphase formation. At the end of this formation process, the majority of $LiN(SO_2CF_3)_2$—HFE gel should be consumed, and a solid interphase should exist on the graphite surface that should imitate a composite interphase with mixed characteristics of inorganic/organic traits, similar to the SEI formed in non-aqueous electrolytes. The sharp and symmetric cathodic/anodic peaks demonstrate the excellent kinetics of $Li^+$-intercalation chemistry. Also displayed in FIG. 1 is a CV performed on the cathode material $LiVPO_4F$ in $LiN(SO_2CF_3)_2$—$LiOSO_2CF_3$ aqueous gel electrolyte, whose delithiation reaction occurs at ~4.20 V. The coupling of graphite and $LiVPO_4F$ in $LiN(SO_2CF_3)_2$—$LiOSO_2CF_3$ aqueous gel electrolyte creates a 4.0 V aqueous lithium-ion battery (LIB). It should be pointed out that the counter electrode for the cathode CV is actually a Li metal foil also pre-coated with $LiN(SO_2CF_3)_2$—HFE gel, which protected it in the $LiN(SO_2CF_3)_2$—$LiOSO_2CF_3$ aqueous gel electrolyte. This fact alone showcased the robust interphase formed from the $LiN(SO_2CF_3)_2$—HFE gel.

Figure 2:
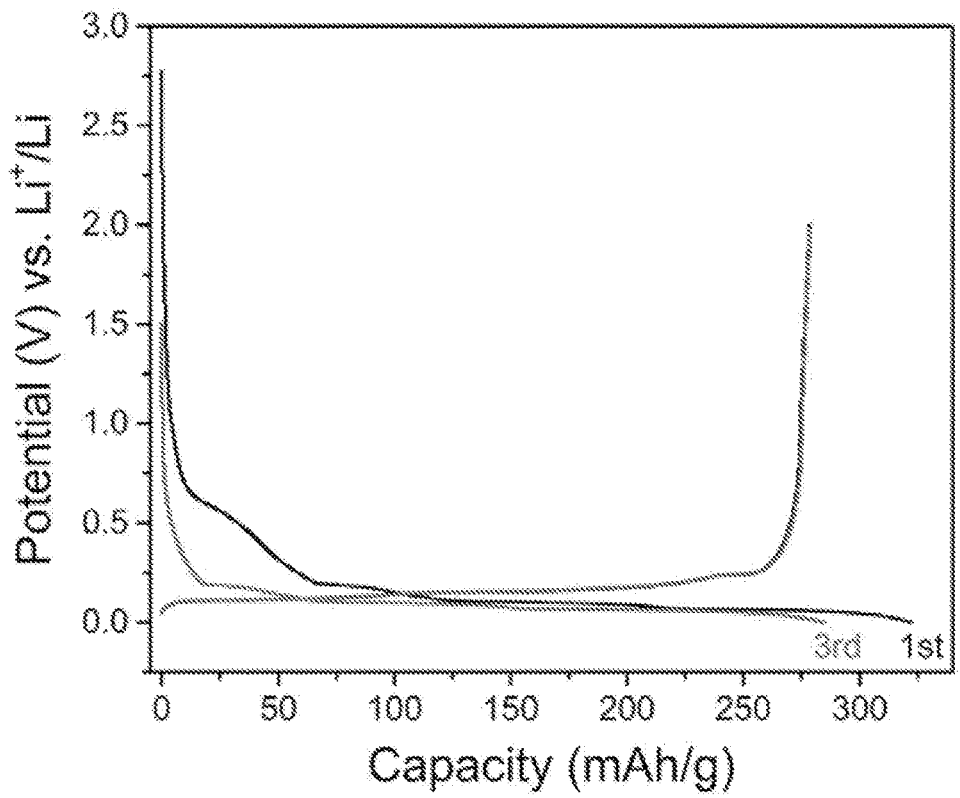
FIG. 2 is a graph of the charge and discharge profiles of a graphite anode pre-coated with a $LiN(SO_2CF_3)_2$—HFE gel. The galvanostatic cycling was conducted in a $LiN(SO_2CF_3)_2$—$LiOSO_2CF_3$ gel electrolyte with an Ag/AgCl reference electrode at 0.1 C. The counter electrode is activated carbon. The potential has been converted to $Li/Li^+$ reference.
Figure 3:
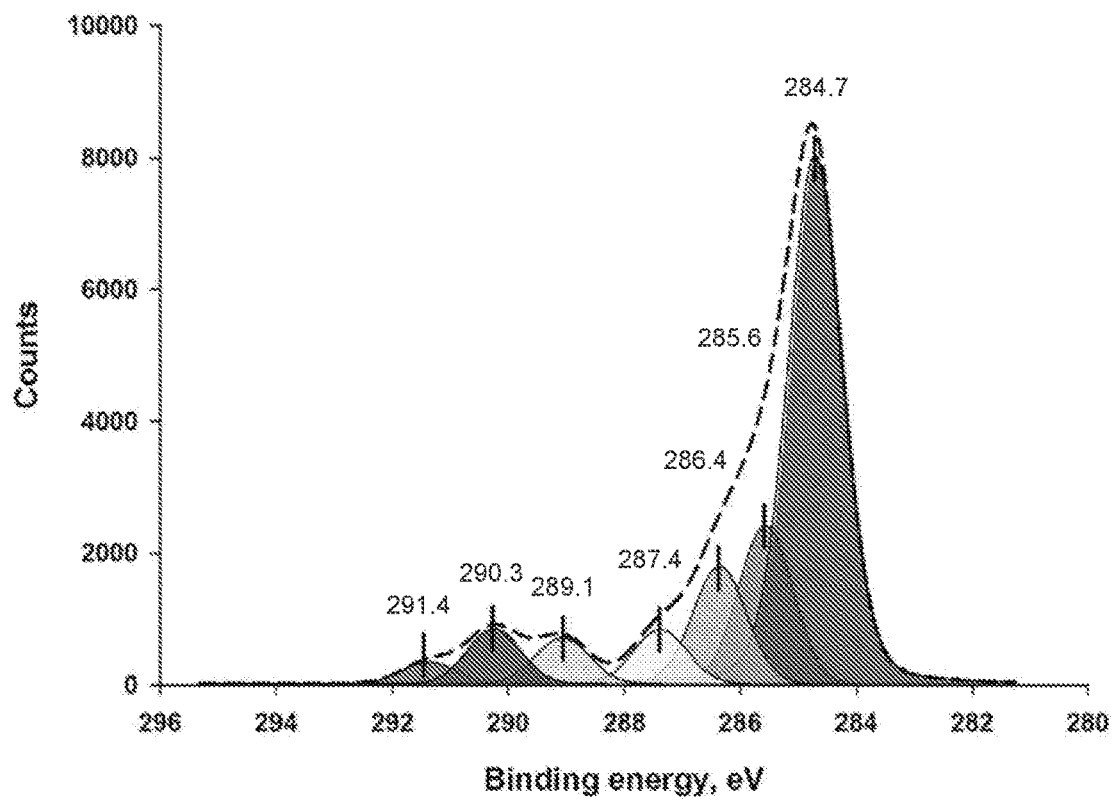
FIG. 3 is a graph of the carbon (C) is spectra for graphite electrodes recovered from cells that were cycled a few times before delithiation.
Figure 4:
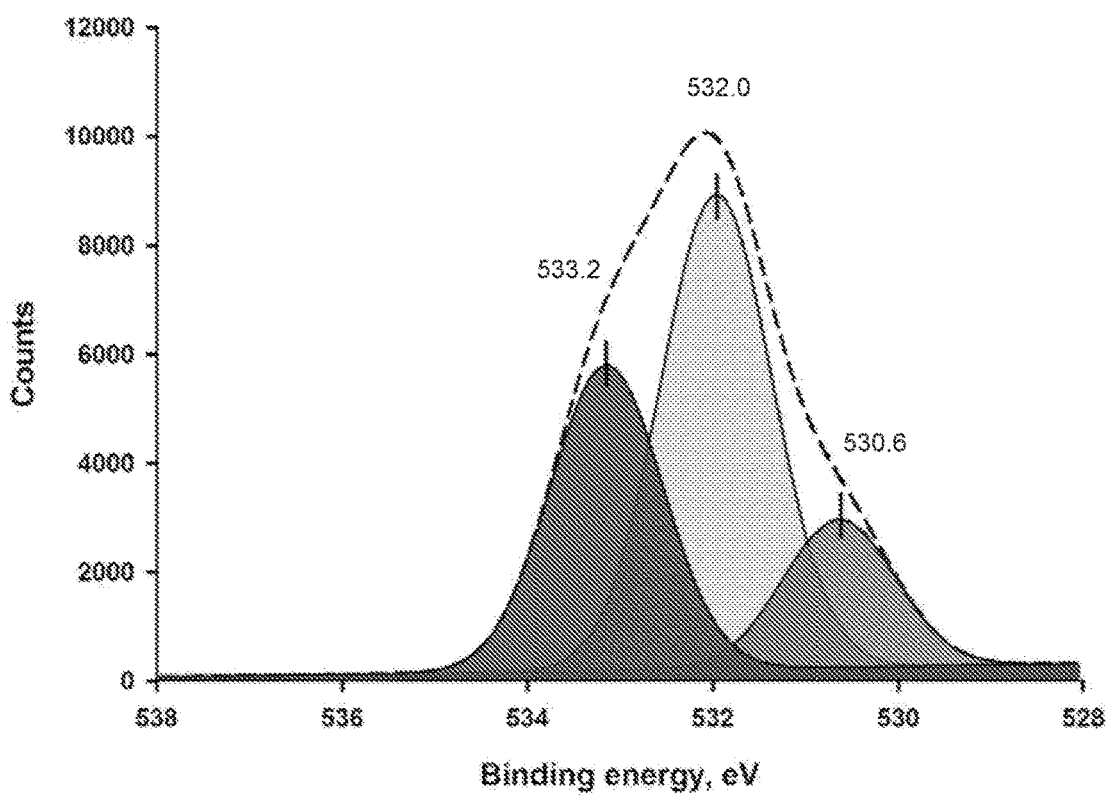
FIG. 4 is a graph of the oxygen (O) is spectra for graphite electrodes recovered from cells that were cycled a few times before delithiation.
Figure 5:
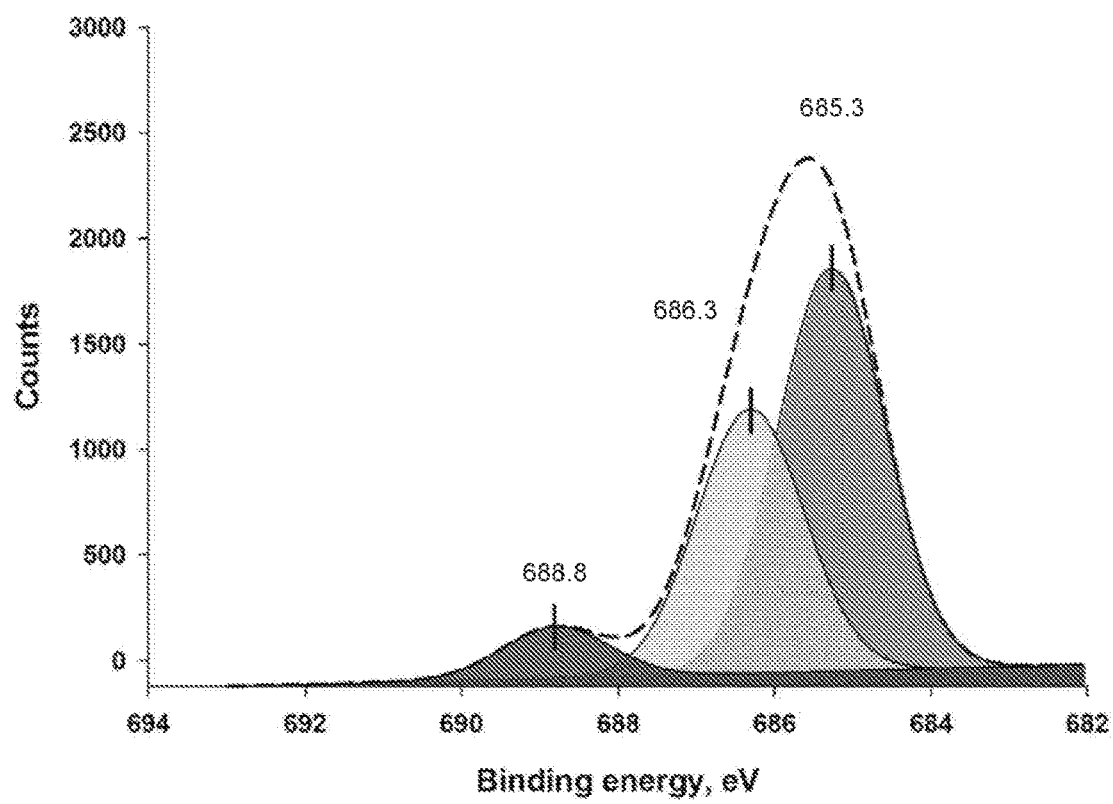
FIG. 5 is a graph of the fluorine (F) is spectra for graphite electrodes recovered from cells that were cycled a few times before delithiation.
Figure 6:
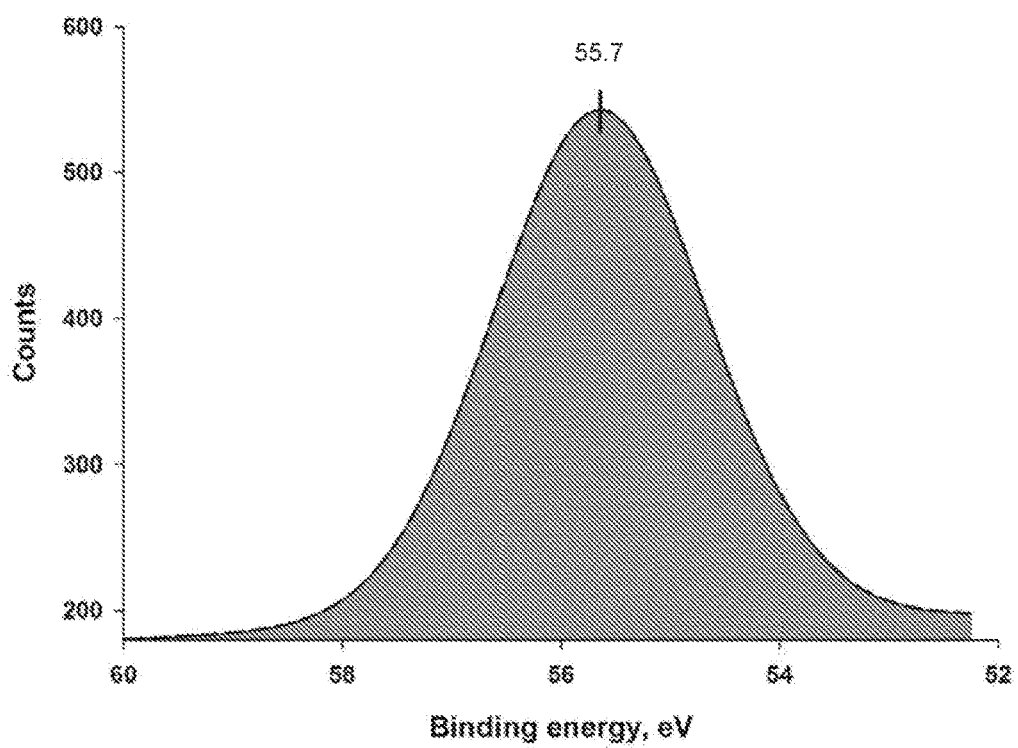
FIG. 6 is a graph of the lithium (Li) 1s spectra for graphite electrodes recovered from cells that were cycled a few times before delithiation.
Figure 16:
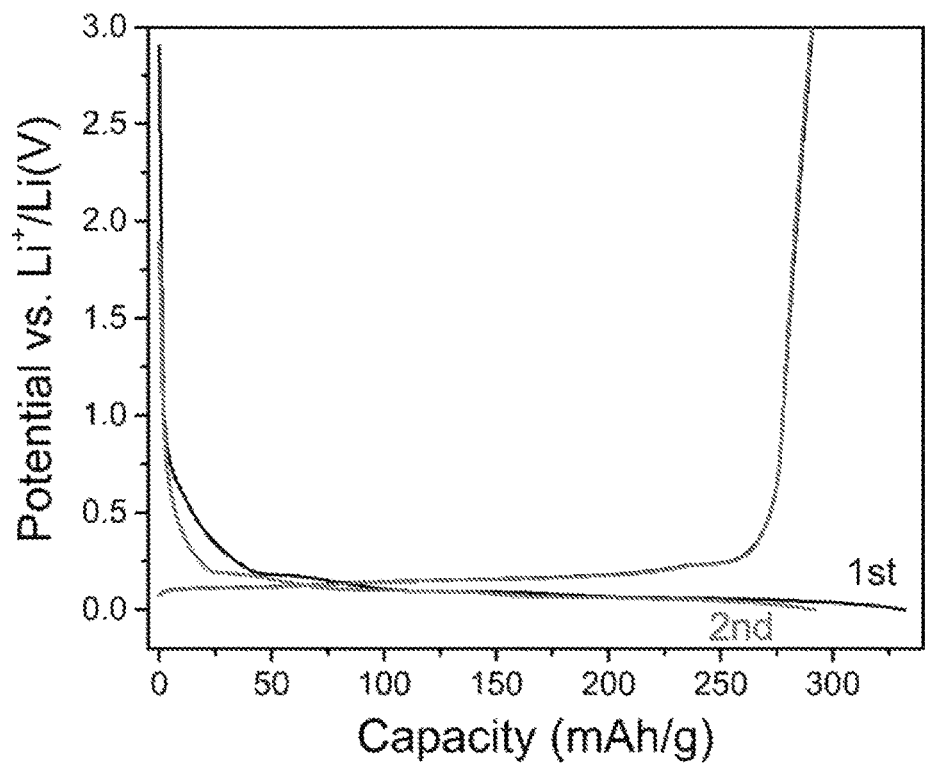
FIG. 16 is a graph of the charge and discharge profiles of a graphite anode in a non-aqueous electrolyte of 1.2 M lithium hexafluorophosphate in a 30:70 ratio by weight of EC and EMC ($LiPF_6$/EC/EMC 30:70).

More rigorous tests on the stability of the new interphase were conducted in a galvanostatic manner, where the protected graphite electrode is repeatedly lithiated and delithiated at constant current (FIG. 2). The voltage profiles clearly reveal that a lithiated graphite compound is successfully formed at stage 1, as evidenced by the plateau at <0.20 V as well as the specific capacity of ~325 mAh/g obtained. The Coulombic efficiency (CE %) in the 1st cycle is 85%, which is slightly lower than the 1st cycle CE % (88%) of the same graphite anode as shown in FIG. 16 in a typical non-aqueous electrolyte (1.2 M lithium hexafluorophosphate in a 30:70 weight ratio of ethylene carbonate and ethyl methyl carbonate ($LiPF_6$/EC/EMC 30:70)). The corresponding irreversible capacity should account for the formation of interphase from the reduction of $LiN(SO_2CF_3)_2$—HFE. The effectiveness of such interphase is immediately reflected in the CE % of the following cycles, which rapidly rise to 99.3% for the 2nd and approaches 99.5% for the later cycles.

Figure 17:
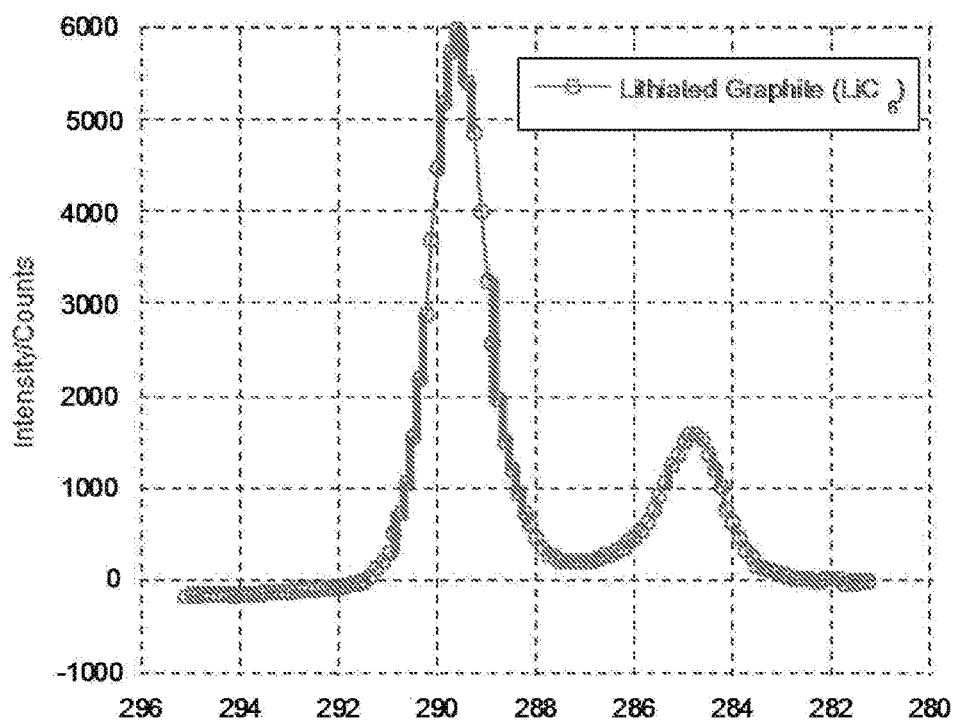
FIG. 17 is a graph showing the high intensity of carbonate species at 289 eV generated by the reaction between lithiated graphite and dimethyl carbonate (DMC) as a rinsing solvent.

The chemical composition of the interphase on cycled graphite was analyzed using X-ray photoelectron spectra (XPS). The graphite electrodes were recovered from the coin-cells at both lithiated and delithiated states. The electrodes were first washed with HFE and then DMC to remove residual HFE and $LiN(SO_2CF_3)_2$, while the subsequent high vacuum prior to XPS sample entry should have removed any trace residual HFE, considering that the boiling temperature of HFE is 93° C. Due to the high reactivity of the lithiated graphite ($LiC_6$), there seems to be a reaction between $LiC_6$ and rinsing solvent DMC when the $LiC_6$ electrode was immersed into the latter. Such reaction produces interphasial artifacts, as evidenced by the unusually high abundance of carbonate species at 289 eV (FIG. 17), which is typical for alkyl carbonates as reduction products from DMC. Therefore, only data collected from the delithiated graphite is shown in FIGS. 3-6. XPS C 1s spectra (FIG. 3) strongly suggests that HFE indeed has been reductively decomposed to form an interphase on graphite, as evidenced by the high abundance of ethereal carbon species (~286 eV), as well as the presence of C—F at 291.4 eV. The latter could also arise from the products generated by the reductive decompositions of —$N(SO_2CF_3)_2$(TFSI), as described previously. O 1s and F 1s spectra separately provide strong evidences for the reductive decompositions of both HFE and TFSI (FIG. 4 and FIG. 5), with the presence of $SO_2$ (533.2 eV) and $CF_2$—O (537 eV) species in the former, and C—F (686.3 eV) and C—$F_3$ (688.8 eV) in the latter. The inorganic species LiF was also detected as an interphase ingredient, supported by 685.3 eV in F 1s (FIG. 5) and 55.7 eV in Li 1s (FIG. 6) spectra, respectively. Thus, this composite interphase would consist of a mixture of organic fluorinated hydrocarbon and inorganic fluorides, both of which have been found previously in interphases formed from diversification non-aqueous electrolytes. One interesting feature is perhaps the likelihood of carbonate ($CO_3^{2-}$) species, as evidenced by 289-290 eV signals in C 1s and 532 eV signals in O 1s. The origin of carbonate-like species might be the trace residual DMC in the $LiN(SO_2CF_3)_2$—HFE gel, or the $CO_2$ dissolved in $LiN(SO_2CF_3)_2$—$LiOSO_2CF_3$ aqueous gel electrolyte, as the preparations of this aqueous electrolyte and its gel have been conducted in an ambient environment.

Figure 19:
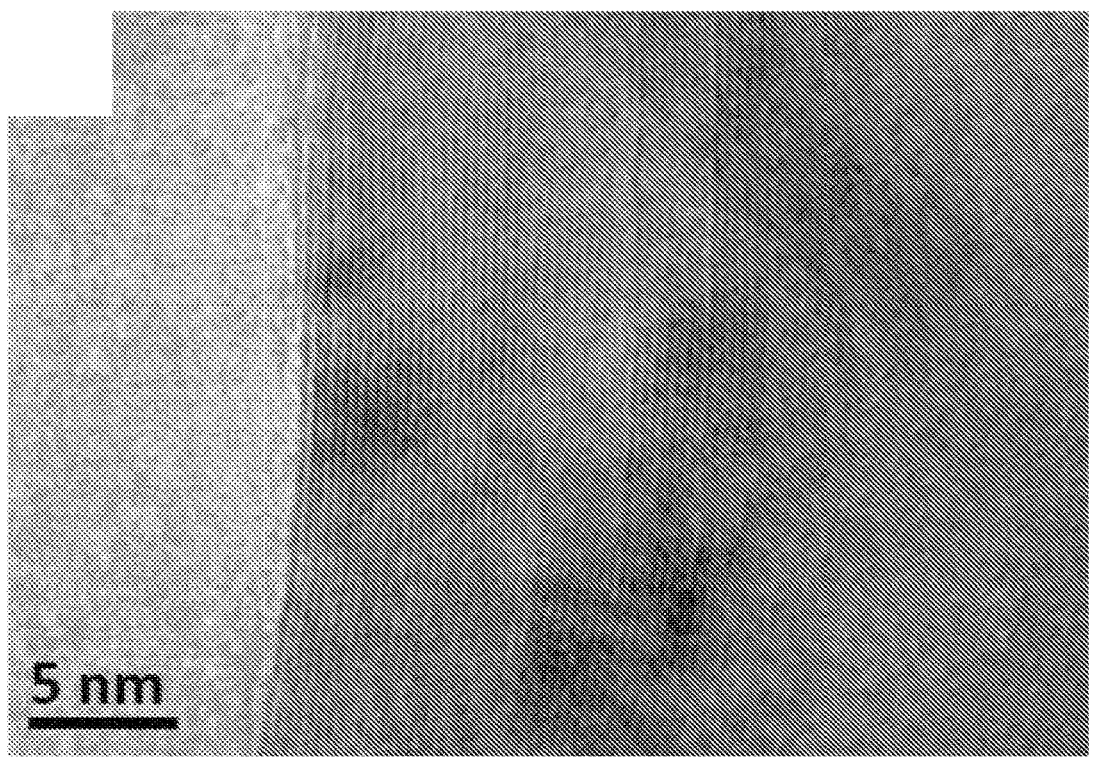
FIG. 19 is a transmission electron microscopy (TEM) image of graphite before 20 cycles with a $LiN(SO_2CF_3)_2$—HFE gel at 0.2 C.
Figure 20:
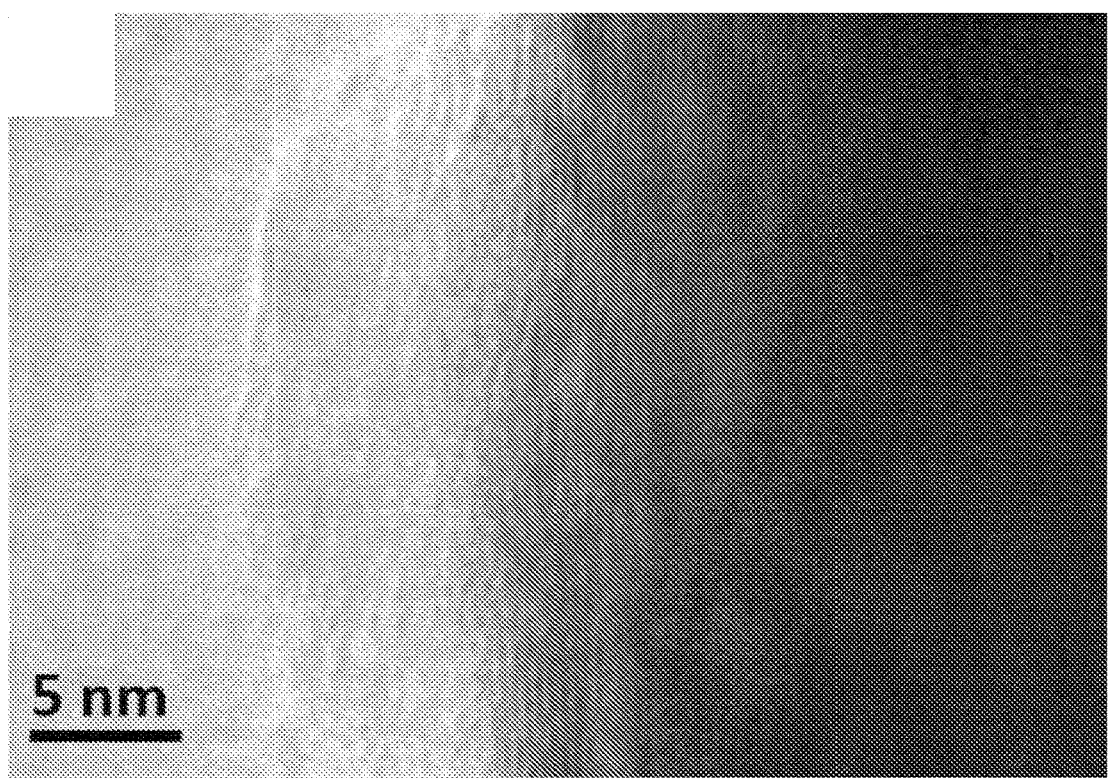
FIG. 20 is a transmission electron microscopy (TEM) image of graphite after 20 cycles with a $LiN(SO_2CF_3)_2$—HFE gel at 0.2 C.

The cycled graphite electrolytes were also examined under transmission electron microscopy (TEM) which revealed an amorphous thin layer of less than 10 nm in thickness covering the crystalline graphite (FIG. 19 and FIG. 20), in sharp contrast with the interphases formed by reduction of TFSI in a $LiN(SO_2CF_3)_2$—$LiOSO_2CF_3$ aqueous electrolyte, a $LiN(SO_2CF_3)_2$—$LiOSO_2CF_3$ aqueous gel electrolyte, or a sodium version of $LiN(SO_2CF_3)_2$—$LiOSO_2CF_3$ aqueous gel electrolyte, where all the interphases seemed to be perfectly crystalline with LiF or NaF as the main component. We attributed this distinct difference to the participation of HFE, whose reductive decomposition into fluoride-containing hydrocarbon oligomers or polymers should be responsible for bringing amorphous and organic characteristics into the interphase, thus rendering the interphase more similar to the SEIs formed in non-aqueous electrolytes.

Figure 18:
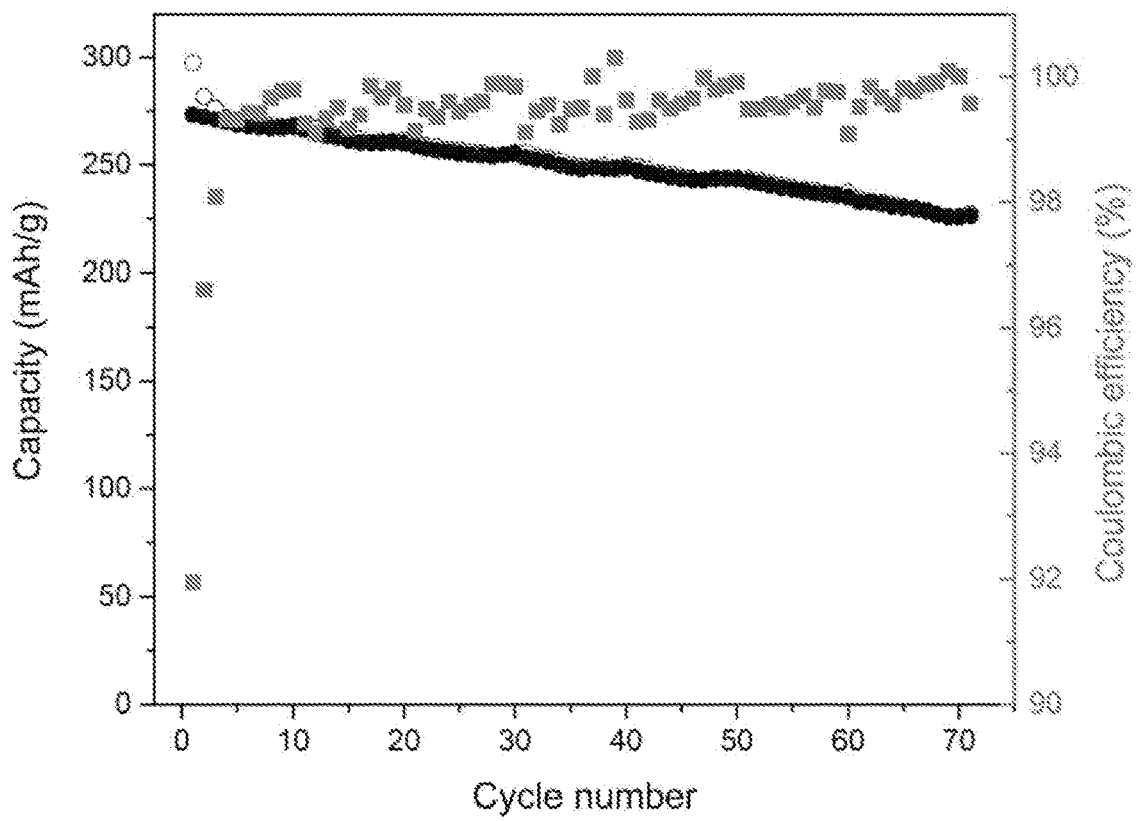
FIG. 18 is a graph of the cycle performance of a graphite anode pre-coated with a gel comprising 0.5 M $LiN(SO_2CF_3)_2$, 10% by weight of polyethylene oxide (PEO), and HFE/DMC/fluoroethylene carbonate (FEC) in a volume ratio of 95:4:1. The galvanostatic cycling was conducted in a $LiN(SO_2CF_3)_2$—$LiOSO_2CF_3$ gel electrolyte as the bulk electrolyte with $LIVPO_4F$ as the cathode at 0.3 C. The capacity is based on anode material mass.
Figure 21:
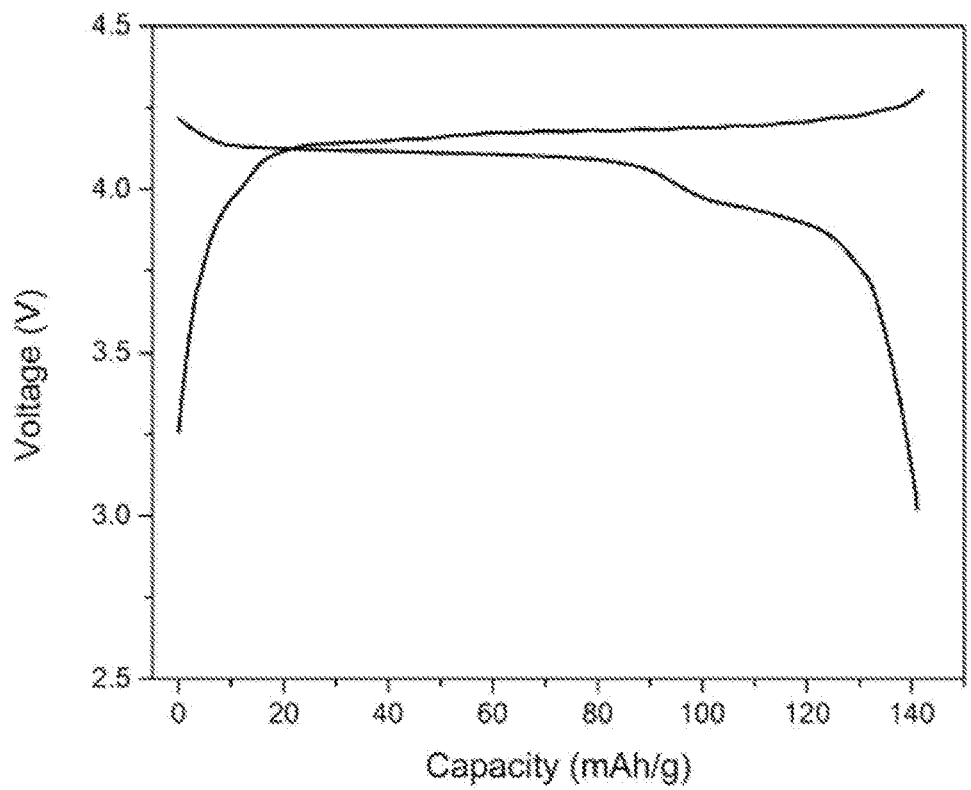
FIG. 21 is a graph of the charge and discharge profiles of a Li metal anode pre-coated with a $LiN(SO_2CF_3)_2$—HFE gel. The galvanostatic cycling was conducted in a $LiN(SO_2CF_3)_2$—$LiOSO_2CF_3$ gel electrolyte as the bulk electrolyte with $LiVPO_4F$ as the cathode at 0.3 C at a temperature of 55° C. The capacity is based on cathode material mass.
Figure 22:
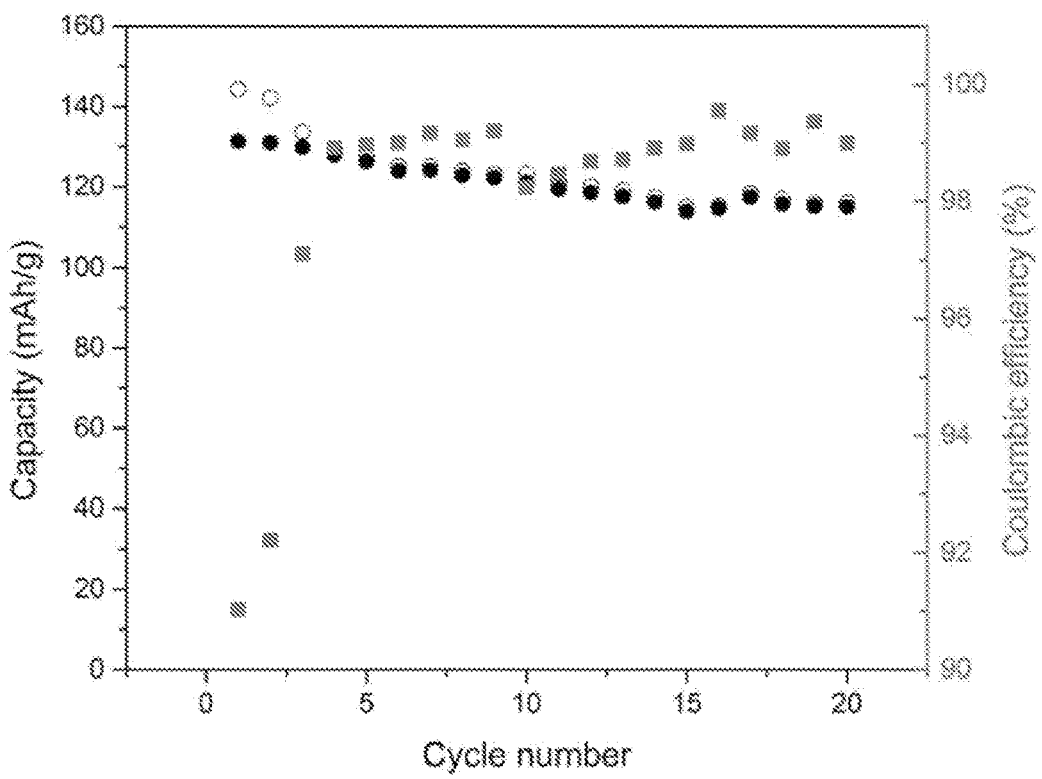
FIG. 22 is a graph of the cycle performance of a Li metal anode pre-coated with a $LiN(SO_2CF_3)_2$—HFE gel. The galvanostatic cycling was conducted in a $LiN(SO_2CF_3)_2$—$LiOSO_2CF_3$ gel electrolyte as the bulk electrolyte with LiVPO$_4$F as the cathode at 0.3 C at a temperature of 55° C. The capacity is based on cathode material mass.

Having confirmed the formation of a new interphase from $LiN(SO_2CF_3)_2$—HFE gel and its effectiveness in stabilizing graphite and even Li metal in $LiN(SO_2CF_3)_2$—$LiOSO_2CF_3$ aqueous gel electrolyte, it is possible to couple such protected anode materials with different cathode chemistries. The redox potential of most cathode materials (e.g., $LiMnO_2$ and $LiCoO_2$) reside comfortably below the anodic stability limit of either a $LiN(SO_2CF_3)_2$—$LiOSO_2CF_3$ aqueous electrolyte or a $LiN(SO_2CF_3)_2$—$LiOSO_2CF_3$ aqueous gel electrolyte, granting us the "anodic flexibility" in sharp contrast to "cathodic challenge." A series of 4.0 V class aqueous Li-ion full cells were thus assembled, using $LiVPO_4F$ or $LiMn_2O_4$ vs either graphite or Li metal, where the whole electrodes were pre-coated with a thin layer of LiN $(SO_2CF_3)_2$—HFE gel, and $LiN(SO_2CF_3)_2$—$LiOSO_2CF_3$ aqueous gel electrolyte was used as the bulk electrolyte. FIGS. 7-12 demonstrate the cycling stabilities of such cells at room temperature (~25° C.). All these full aqueous LIBs operate reversibly at or above 4.0 V plateaus for up to 50 cycles, delivering capacities close to the corresponding theoretical values. Adding 1% fluoroethylene carbonate (FEC) to the $LiN(SO_2CF_3)_2$—HFE gel results in better cycling performances (FIG. 18), indicating that the quality of the formed SEI is quite sensitive to the chemical composition of the pre-coated interphase precursor. Preliminary tests at elevated temperature (55° C.) were also conducted (FIG. 21 and FIG. 22), and showed a faster fading rate in capacity, however, decent cell operation continued without sudden failure, demonstrating that the formed aqueous SEI is indeed robust though not ideal.

Although the reversibility of the above cells is still less than ideal, as evidenced by gradually fading capacities and an average CE % between 98-99.5%, the fact that these anode materials can be reversibly cycled in aqueous electrolytes based on $LiN(SO_2CF_3)_2$—$LiOSO_2CF_3$ aqueous gel electrolyte represents a fundamental breakthrough. It enables a quantum leap in the energy density of aqueous batteries, and marks the elimination of a clear demarcation drawn between aqueous and non-aqueous batteries by their respective energy output.

The safety of these 4.0 V class aqueous Li-ion cells would have been ensured by the non-flammable nature of the aqueous electrolyte, as well as the low reactivity of LiN $(SO_2CF_3)_2$—$LiOSO_2CF_3$ aqueous electrolyte and LiN $(SO_2CF_3)_2$—$LiOSO_2CF_3$ aqueous gel electrolyte toward Li metal. The $LiN(SO_2CF_3)_2$—HFE gel shows similar inertness toward Li metal (FIG. 15). Hence, even if the interphase formed from the $LiN(SO_2CF_3)_2$—HFE gel ruptures for any reason, such slow reactions between lithiated graphite (or Li metal) with $LiN(SO_2CF_3)_2$—$LiOSO_2CF_3$ aqueous gel electrolyte would still help prevent a catastrophic ending of the cells. This "gracious failure" causes these 4.0 V aqueous Li-ion cells to differ significantly from the cells using Li metal protected by a dense ceramic solid electrolyte in dilute aqueous electrolytes—a system where any crack or defect in the ceramic electrolyte layer will result in a vehement reaction between Li metal and water.

Figure 13:
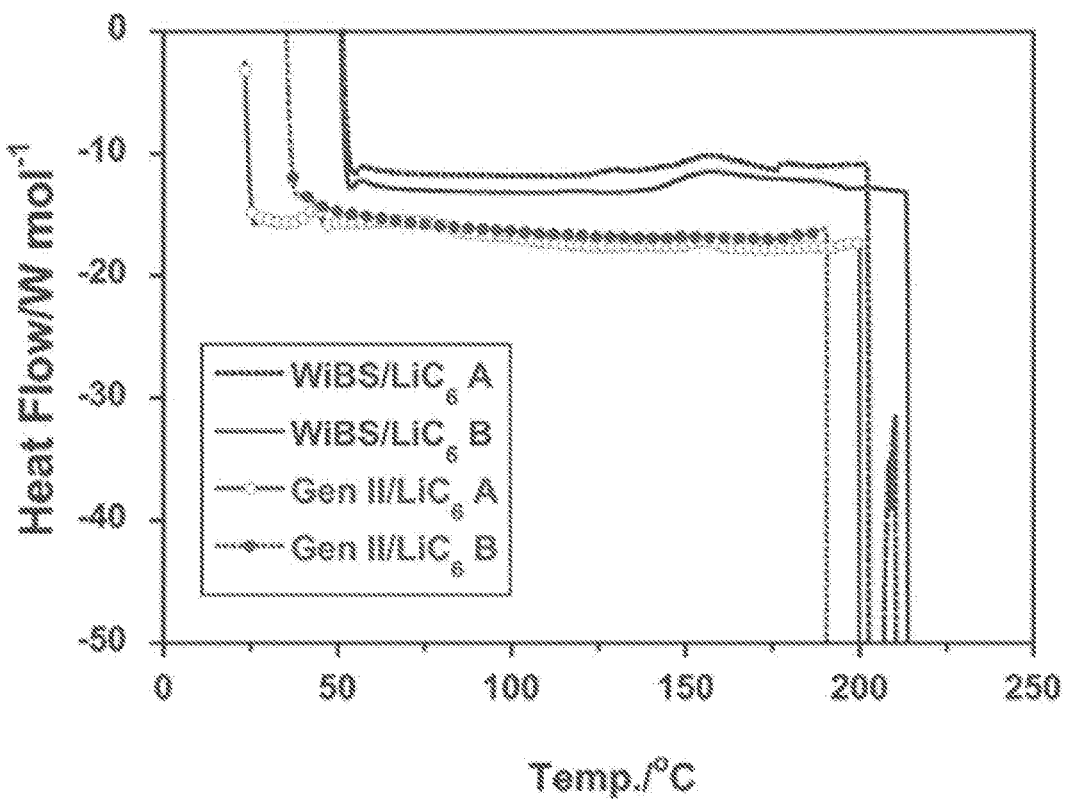
FIG. 13 are differential scanning calorimetry (DSC) curves of lithiated graphite ($LiC_6$) electrodes in the presence of a $LiN(SO_2CF_3)_2$—$LiOSO_2CF_3$ gel electrolyte (labeled ad WiBS) and in the presence of a 1 M $LiPF_6$ in a 30:70 ratio by weight of ethylene carbonate (EC)/ethyl methyl carbonate (EMC) electrolyte (labeled as Gen II).
Figure 14:
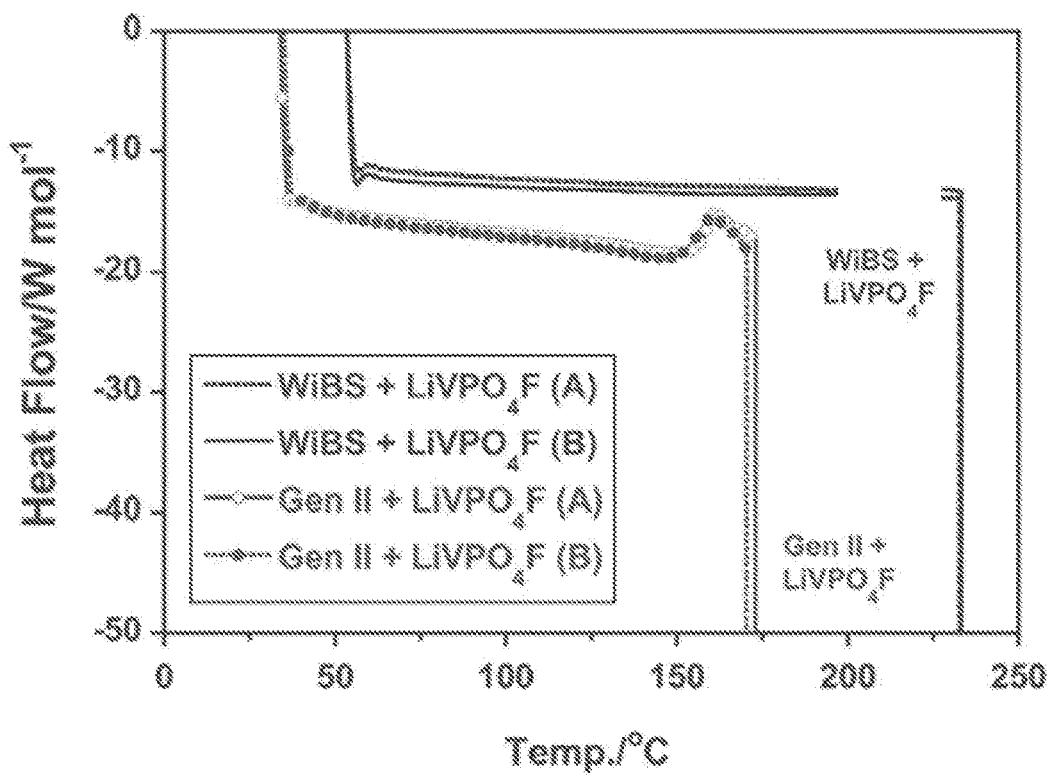
FIG. 14 are DSC curves of delithiated $LiVPO_4F$ electrodes in the presence of non-aqueous electrolyte of a $LiN(SO_2CF_3)_2$—$LiOSO_2CF_3$ gel electrolyte (labeled ad WiBS) and in the presence of a 1 M $LiPF_6$ in a 30:70 ratio by weight of ethylene carbonate (EC)/ethyl methyl carbonate (EMC) electrolyte (labeled as Gen II).
Figure 23:
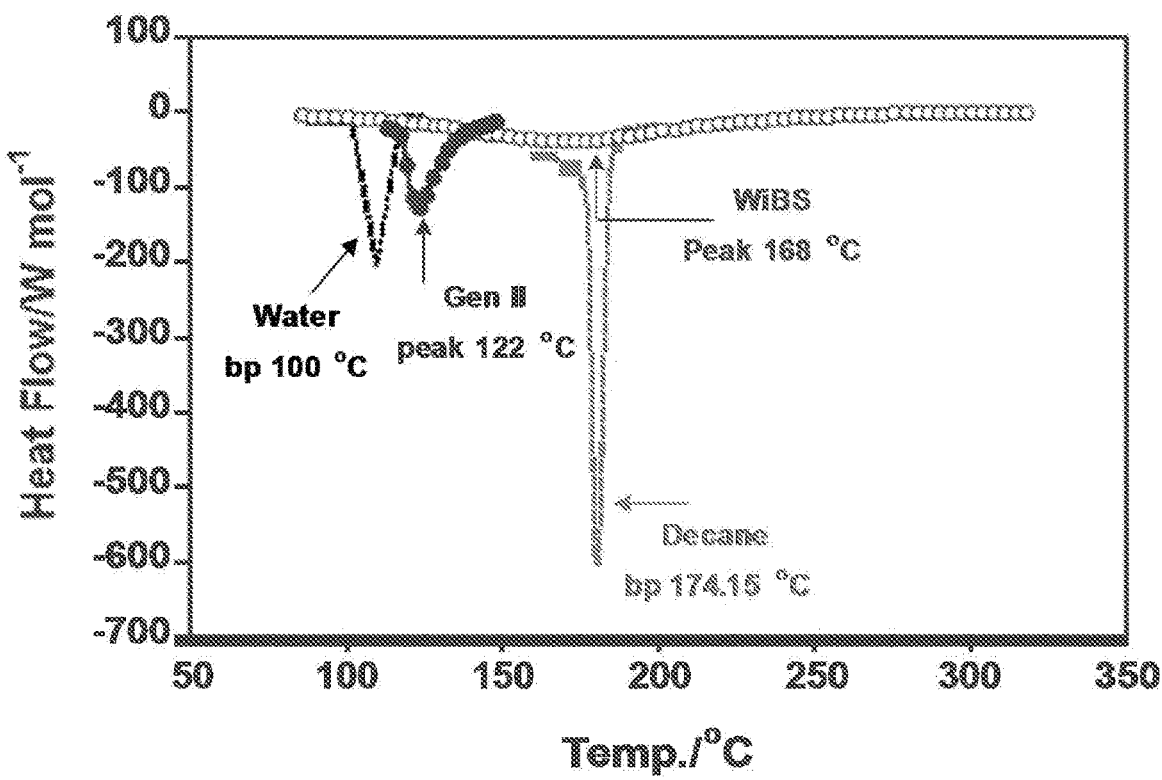
FIG. 23 is a graph comparing the vapor pressure for a non-aqueous electrolyte of 1.2 M lithium hexafluorophosphate in a 30:70 ratio by weight of EC and EMC (LiPF$_6$/EC/EMC 30:70) (labeled as Gen II electrolyte) and for a LiN(SO$_2$CF$_3$)$_2$—LiOSO$_2$CF$_3$ gel electrolyte (labeled as WiBS). The vapor pressures were measured in specially pre-perforated DSC pans.
Figure 24:
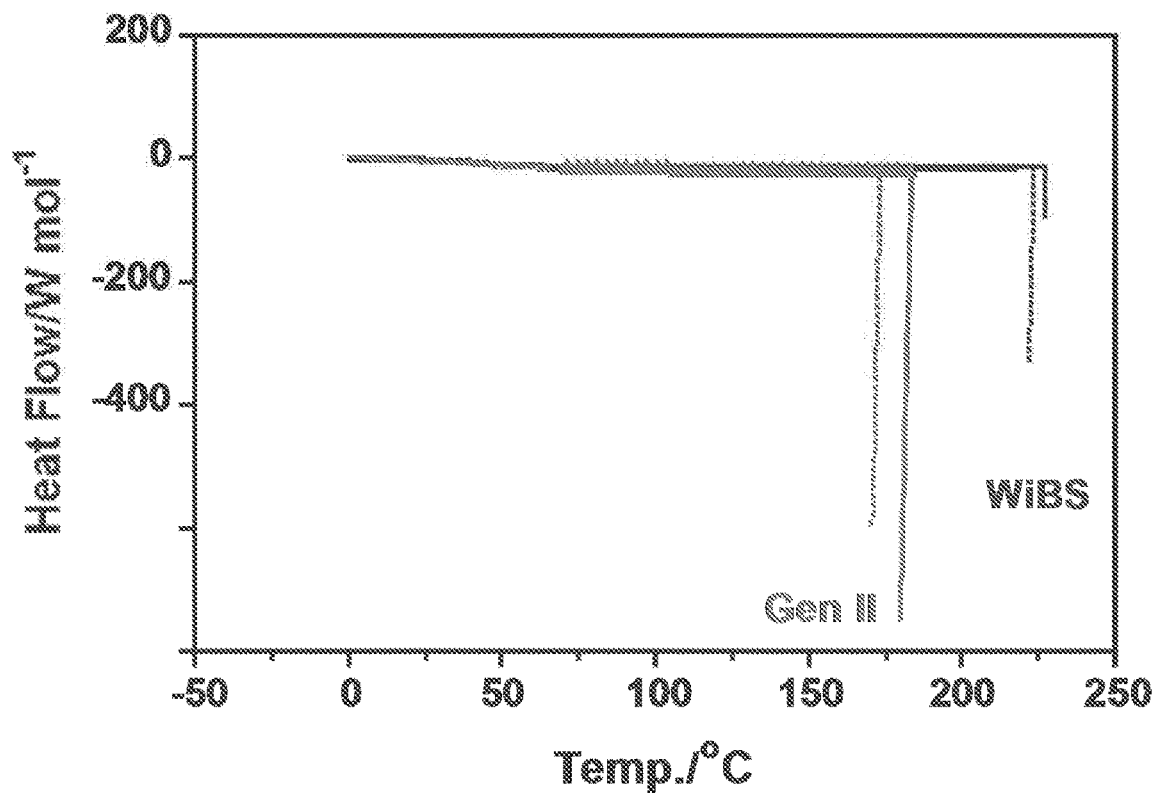
FIG. 24 is a graph comparing the rupture temperatures for a non-aqueous electrolyte of 1.2 M lithium hexafluorophosphate in a 30:70 ratio by weight of EC and EMC (LiPF$_6$/EC/EMC 30:70) (labeled as Gen II) and for a LiN(SO$_2$CF$_3$)$_2$—LiOSO$_2$CF$_3$ gel electrolyte (labeled as WiBS). The vapor pressures were measured in hermetical DSC pans.

Additional safety validation on a material level comes from the thermal stability of the electrolyte itself as well as their chemical stability with the charged electrodes, both of which were evaluated with differential scanning calorimetry (DSC). To ensure reproducibility, at least two scans were conducted for each sample. FIG. 23 compares the vapor pressure of both $LiN(SO_2CF_3)_2$—$LiOSO_2CF_3$ aqueous gel electrolyte (labeled as WiBS) and a non-aqueous electrolyte of 1.2 M $LiPF_6$ in a 30:70 ratio by weight of ethylene carbonate (EC) and ethyl methyl carbonate (EMC) (labeled as Gen II) as measured in a special pre-perforated DSC pan. While Gen II shows onset evaporation of the bulk electrolyte at ~110° C. because of EMC (with a boiling point of 110° C.), the escape of water from WiBS happens with much higher difficulty, indicating that water molecules have been tightly bound by the high ion population. These electrolytes were also loaded into hermetical DSC pans, whose rupture temperature was used as the indicator of thermal inertness (FIG. 24). Again, WiBS showed higher thermal stability by remaining inactive until about 220° C., when pressure of the steam ruptured the pans, while the pans containing Gen II opened much earlier between about 160-180° C. More important is the chemical reactivity demonstrated by these electrolytes in the presence of charged electrodes, i.e., lithiated graphite $LiC_6$ and delithiated cathode $LiVPO_4$, respectively. These electrodes were recovered from the full aqueous Li-ion cells at 100% charged state (4.3 V), and then sealed into hermetical pans with about 10 mg WiBS or Gen II. While WiBS/$LiC_6$ displayed similar (but slightly better) reactivity when compared with Gen II/$LiC_6$ (FIG. 13), significant difference exists between the two cathode/electrolyte combinations, with WiBS/$LiVPO_4F$ being much more stable than Gen II/$LiVPO_4F$ by rupturing at temperatures >50° C. higher (FIG. 14). According to previous safety investigations of LIBs, the major heat generated during thermal runaway is attributed to the reaction between delithiated cathode and electrolyte, while the reaction between lithiated anode and electrolyte generates less heat but often serves as a trigger to the self-propagating reactions. As the fuel in the chemical combustions, non-aqueous electrolyte is often a key factor responsible for catastrophic cell failures. The above DSC results suggest that the replacement of non-aqueous electrolytes by aqueous counterparts renders the 4.0 V aqueous Li-ion cell safer.

Figure 7:
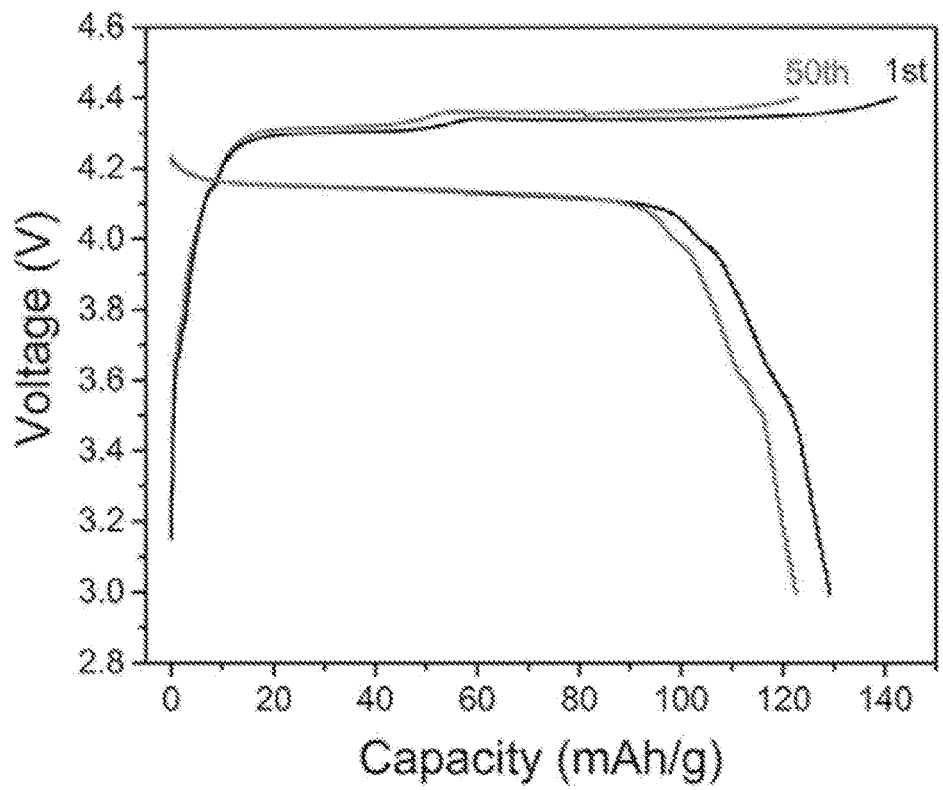
FIG. 7 is a graph of the charge and discharge profiles of a Li metal anode pre-coated with a $LiN(SO_2CF_3)_2$—HFE gel. The galvanostatic cycling was conducted in a $LiN(SO_2CF_3)_2$—$LiOSO_2CF_3$ gel electrolyte as the bulk electrolyte with $LiVPO_4F$ as the cathode at 0.3 C. The capacity is based on cathode material mass.
Figure 8:
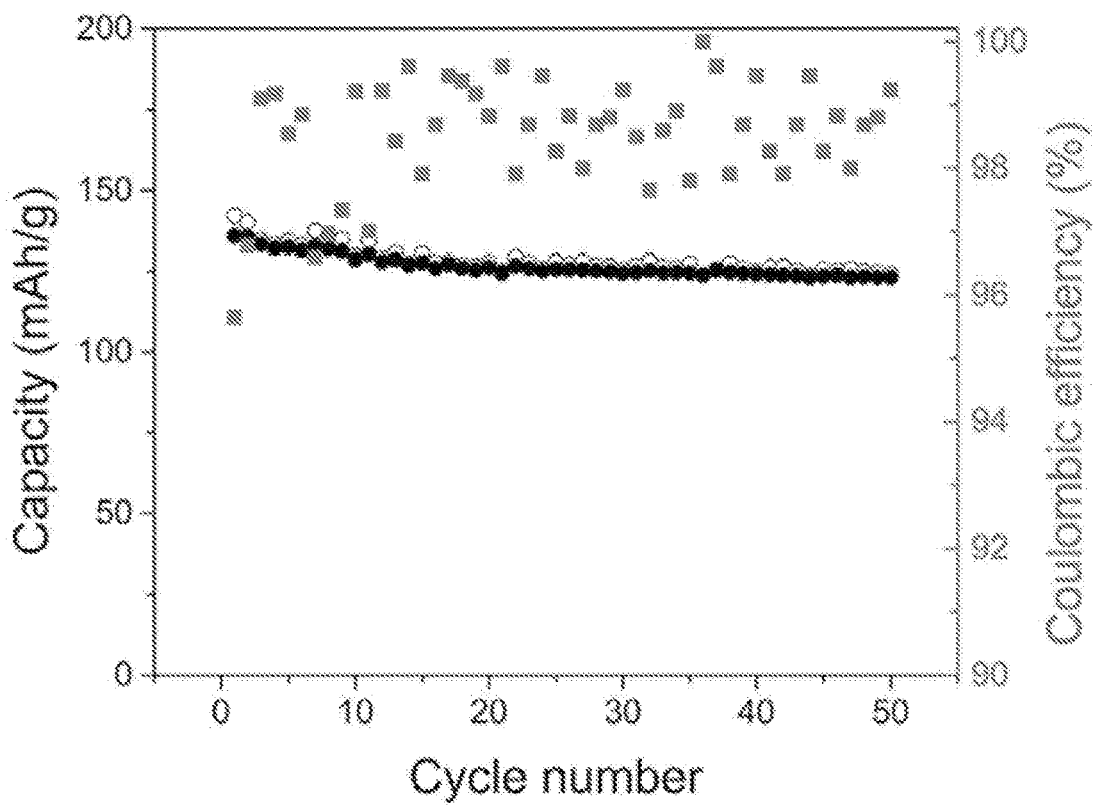
FIG. 8 is a graph of the cycle performance of a Li metal anode pre-coated with a $LiN(SO_2CF_3)_2$—HFE gel. The galvanostatic cycling was conducted in a $LiN(SO_2CF_3)_2$—$LiOSO_2CF_3$ gel electrolyte as the bulk electrolyte with $LiVPO_4F$ as the cathode at 0.3 C. The capacity is based on cathode material mass.
Figure 9:
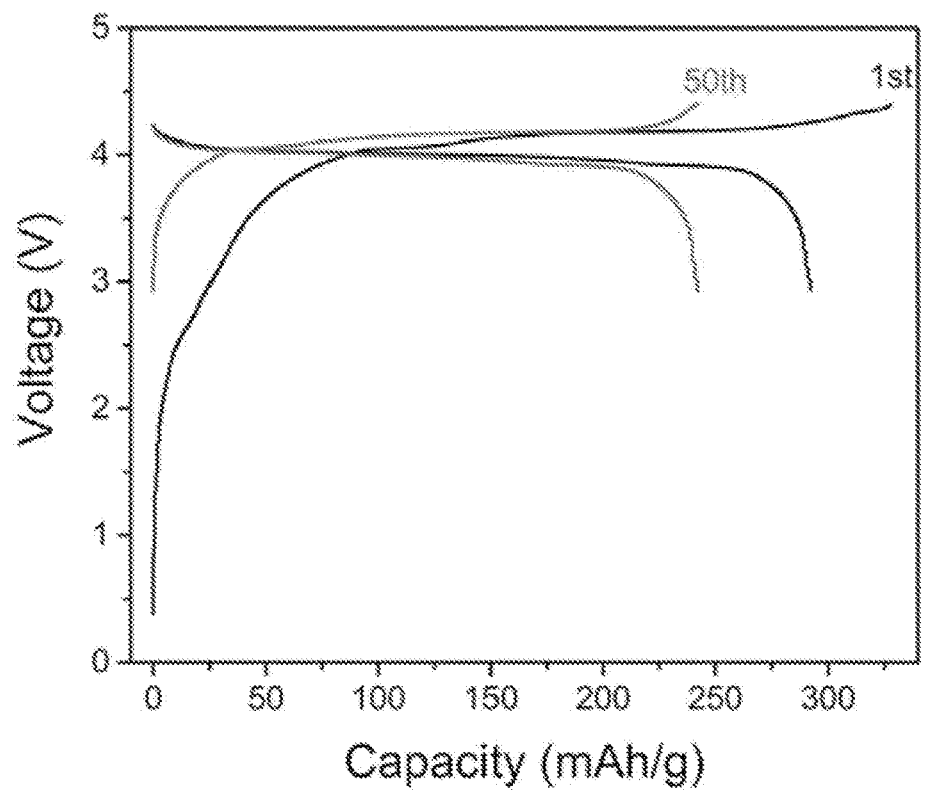
FIG. 9 is a graph of the charge and discharge profiles of a graphite anode pre-coated with a $LiN(SO_2CF_3)_2$—HFE gel. The galvanostatic cycling was conducted in a $LiN(SO_2CF_3)_2$—$LiOSO_2CF_3$ gel electrolyte as the bulk electrolyte with $LiVPO_4F$ as the cathode at 0.3 C. The capacity is based on anode material mass.
Figure 10:
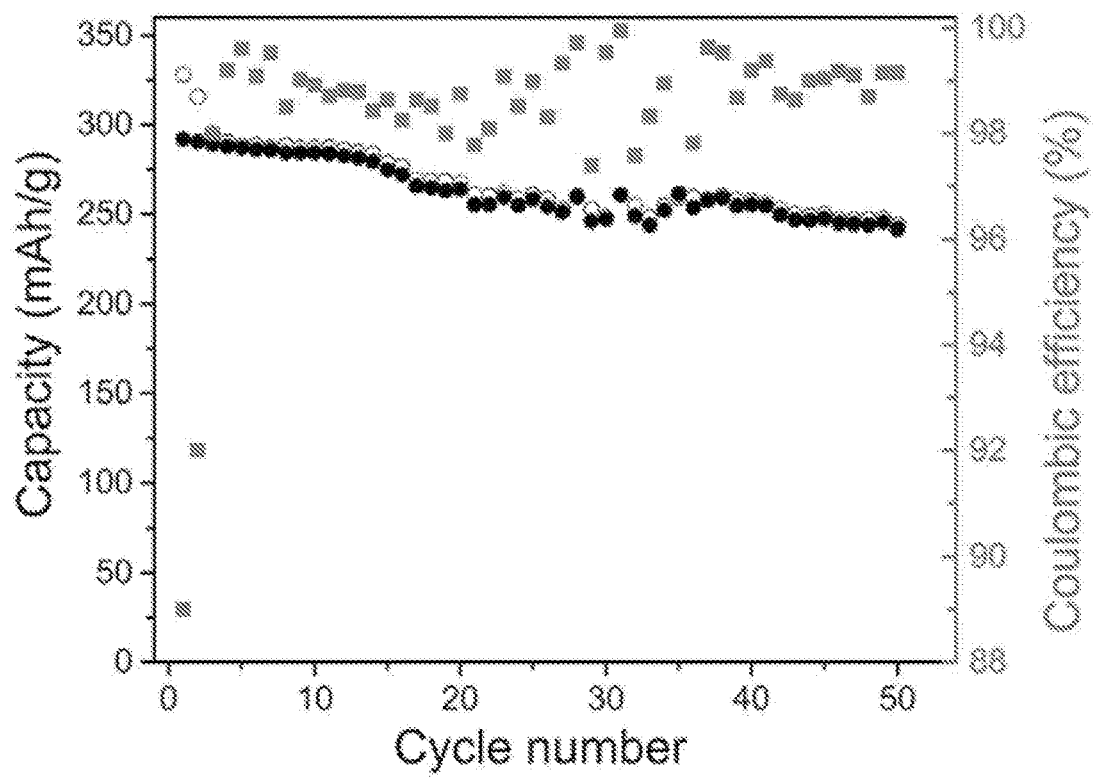
FIG. 10 is a graph of the cycle performance of a graphite anode pre-coated with a $LiN(SO_2CF_3)_2$—HFE gel. The galvanostatic cycling was conducted in a $LiN(SO_2CF_3)_2$—$LiOSO_2CF_3$ gel electrolyte as the bulk electrolyte with $LiVPO_4F$ as the cathode at 0.3 C. The capacity is based on anode material mass.
Figure 11:
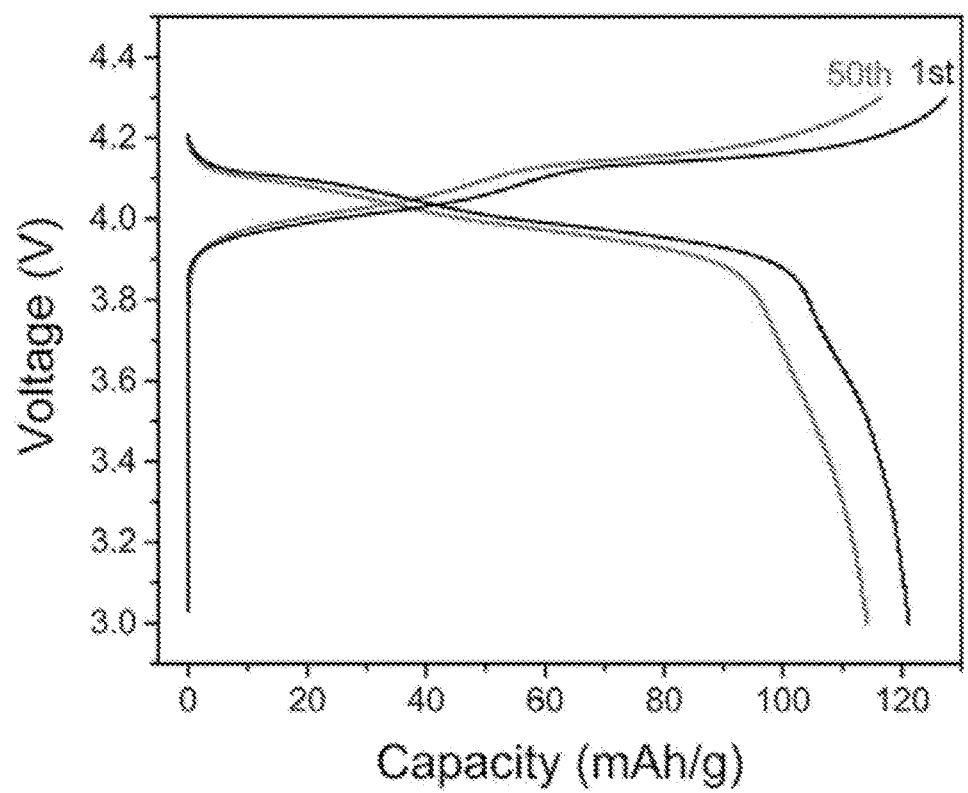
FIG. 11 is a graph of the charge and discharge profiles of a Li metal anode pre-coated with a $LiN(SO_2CF_3)_2$—HFE gel. The galvanostatic cycling was conducted in a $LiN(SO_2CF_3)_2$—$LiOSO_2CF_3$ gel electrolyte as the bulk electrolyte with $LiMn_2O_4$ as the cathode at 0.3 C. The capacity is based on cathode material mass.
Figure 12:
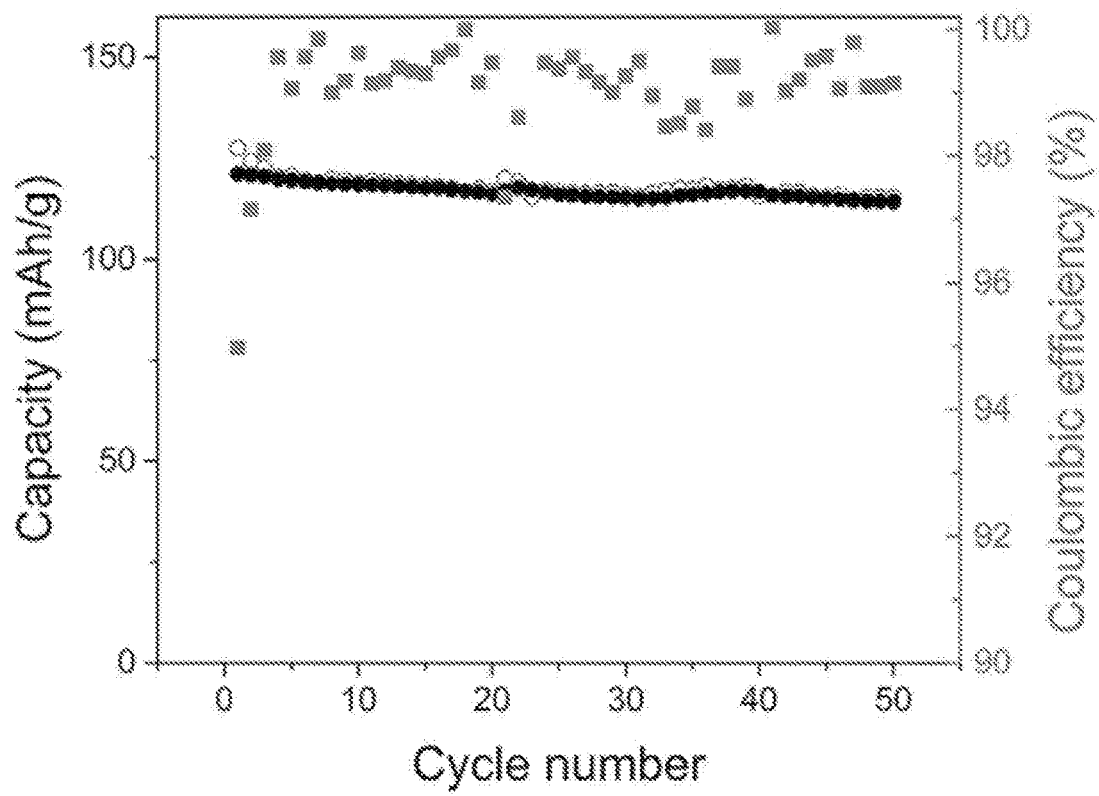
FIG. 12 is a graph of the cycle performance of a Li metal anode pre-coated with a $LiN(SO_2CF_3)_2$—HFE gel. The galvanostatic cycling was conducted in a $LiN(SO_2CF_3)_2$—$LiOSO_2CF_3$ gel electrolyte as the bulk electrolyte with $LiMn_2O_4$ as the cathode at 0.3 C. The capacity is based on cathode material mass.
Figure 25:
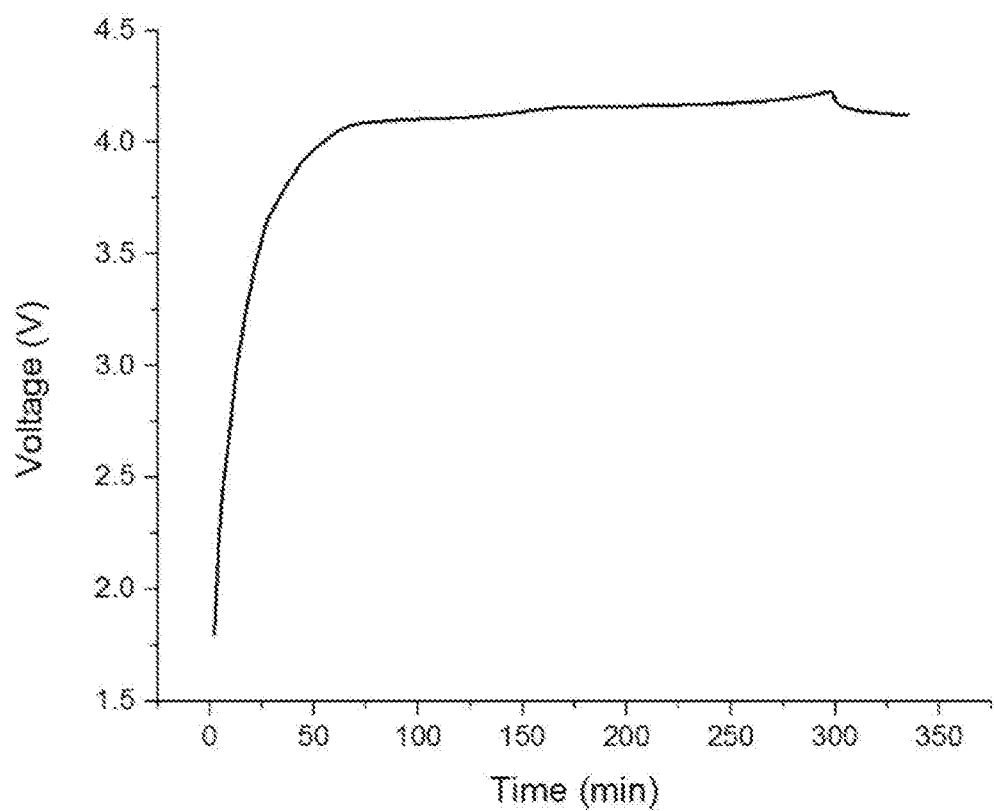
FIG. 25 is a graph of the charging profile of a 4.0 V Li-ion pouch cell constructed with a graphite anode pre-coated with a LiN(SO$_2$CF$_3$)$_2$—HFE gel. The galvanostatic cycling was conducted in a LiN(SO$_2$CF$_3$)$_2$—LiOSO$_2$CF$_3$ gel electrolyte as the bulk electrolyte with LiVPO$_4$F as the cathode at 0.2 C (2.8 mA).

The safety of these 4.0 V aqueous Li-ion cells was further validated by physical abuse of a small pouch cell constructed with the identical chemistry shown in FIG. 7, i.e, a graphite anode protected by $LiN(SO_2CF_3)_2$—HFE gel, a $LiVPO_4$ cathode, and $LiN(SO_2CF_3)_2$—$LiOSO_2CF_3$ aqueous gel electrolyte. This cell of about 13.98 mAh was charged at 0.2 C until 100% state of charged (FIG. 25) and then a nail was driven through it multiple times. No fire or smoke ensued. Surprisingly, a multimeter showed that the cell managed to maintain its open circuit voltage (OCV) at 4.03 V, which gradually decayed to approximately 0.031 V overnight. This is in sharp contrast to any LIB based on non-aqueous electrolytes, which would instantly short-circuit upon nail penetration. We attributed this sluggishness to the viscous $LiN(SO_2CF_3)_2$—HFE gel and the conformal interphase formed after its reductive decomposition, which might partially insulate the contacts between cathode and anode at the point of puncture, and allowed the energy to dissipate at a very sluggish pace. This "gracious manner" of failure for a 4.0 V call Li-ion cell confirmed again the safety of the aqueous electrolytes and the success of the inhomogeneous additive strategy.

In summary, the "cathodic challenge" was successfully resolved using aqueous electroltyes by designing a unique inhomogeneous electrolyte additive approach to minimize the competitive water reduction on graphite or Li metal surfaces during the interphase formation. Upon reductive decomposition during the first charging process, the highly fluorinated additive forms a protective interphase that enables the reversible cycling of both graphite and Li metal anodes in aqueous electrolytes. Surface analyses using XPS and TEM confirmed that such interphase is of amorphous nature and consists of fluorinated hydrocarbon species along with inorganic fluoride LiF. Coupling these anode materials thus protected with various cathode chemistries led to a series of 4.0 V class aqueous Li-ion batteries, whose energy densities approach those state-of-the art LIBs but with significantly enhanced safety. Although the cycling stability of such 4.0 V class aqueous Li-ion needs further improvement, their emergence represents a fundamental breakthrough across the gap separating aqueous and non-aqueous batteries.

Having now fully described this invention, it will be understood by those of ordinary skill in the art that the same can be performed within a wide and equivalent range of conditions, formulations and other parameters without affecting the scope of the invention or any embodiment thereof.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

All patents and publications cited herein are fully incorporated by reference herein in their entirety.

We claim:

1. A composition comprising:
   (a) an anode;
   (b) an aqueous electrolyte; and
   (c) a gel electrolyte;
   wherein the gel electrolyte comprises a polymer and a fluoride additive, wherein the aqueous electrolyte and the gel electrolyte are phase-separated, and wherein the fluoride additive decomposes to form a solid electrolyte interface (SEI) on the anode surface.

2. The composition of claim 1, wherein the anode comprises lithium metal, graphite, silicon, or combinations thereof.

3. The composition of claim 1, wherein the fluoride additive comprises an organic fluorinated hydrocarbon, an inorganic fluoride, or a fluorinated ether.

4. The composition of claim 1, wherein the fluoride additive comprises 1,1,2,2,-tetrafluoroethyl-2',2',2'-trifluoroethyl ether.

5. The composition of claim 1, wherein the gel electrolyte further comprises a lithium salt.

6. The composition of claim 5, wherein the lithium salt comprises $LiN(SO_2CF_3)_2$.

7. An electrochemical cell comprising:
   (a) an anode;
   (b) a cathode;
   (c) a gel electrolyte; and
   (d) an aqueous electrolyte;
   wherein the gel electrolyte comprises a polymer and a fluoride additive, wherein the aqueous electrolyte and the gel electrolyte are phase separated, and wherein the fluoride additive decomposes to form a solid electrolyte interface (SEI) on the anode surface.

8. The electrochemical cell of claim 7, wherein the anode comprises lithium metal, graphite, silicon, or a combination thereof.

9. The electrochemical cell of claim 7, wherein the fluoride additive comprises an organic fluorinated hydrocarbon, an inorganic fluoride, or a fluorinated ether.

10. The electrochemical cell of claim 7, wherein the aqueous electrolyte comprises at least one lithium salt.

11. The electrochemical cell of claim 7, wherein the aqueous electrolyte comprises at least one lithium salt selected from the group consisting of $LiN(SO_2CF_3)_2$, $LiN(SO_2CH_3)_2$, $LiN(SO_2C_4H_9)_2$, $LiN(SO_2C_2F_5)_2$, $LiN(SO_2C_4F_9)_2$, $LiN(SO_2F_3)(SO_2C_4F_9)$, $LiN(SO_2C_2F_5)(SO_2C_4F_9)$, $LiN(SO_2C_2F_4SO_2)$, $LiN(SO_2F)_2$, $LiN(SO_2F)(SO_2CF_3)$, and $LiOSO_2CF_3$.

12. The electrochemical cell of claim 7, wherein the anode comprises lithium, the cathode comprises $LiMn_2O_4$, and the aqueous electrolyte comprises $LiN(SO_2CF_3)_2$ and $LiOSO_2CF_3$.

13. The electrochemical cell of claim 7, wherein the anode comprises graphite, the cathode comprises $LiVPO_4F$, and the aqueous electrolyte comprises $LiN(SO_2CF_3)_2$ and $LiOSO_2CF_3$.

14. The electrochemical cell of claim 7, wherein the anode comprises lithium, the cathode comprises $LiVPO_4F$, and the aqueous electrolyte comprises $LiN(SO_2CF_3)_2$ and $LiOSO_2CF_3$.

15. The composition of claim 1, wherein the anode has a lithiation/delithiation potential of between 0 V and 0.5 V versus $Li^+/Li$.

16. The electrochemical cell of claim 7, wherein the electrochemical cell has a fuel cell output voltage between 3.5 V and 5.0 V.

* * * * *